(12) United States Patent
Melodia et al.

(10) Patent No.: US 11,949,544 B2
(45) Date of Patent: Apr. 2, 2024

(54) DEEP LEARNING-BASED POLYMORPHIC PLATFORM

(71) Applicant: Northeastern University, Boston, MA (US)

(72) Inventors: Tommaso Melodia, Newton, MA (US); Francesco Restuccia, Boston, MA (US)

(73) Assignee: Northeastern University, Boston, MA (US)

(*) Notice: Subject to any disclaimer, the term of this patent is extended or adjusted under 35 U.S.C. 154(b) by 242 days.

(21) Appl. No.: 17/604,476

(22) PCT Filed: Feb. 24, 2020

(86) PCT No.: PCT/US2020/019411
§ 371 (c)(1),
(2) Date: Oct. 18, 2021

(87) PCT Pub. No.: WO2020/236236
PCT Pub. Date: Nov. 26, 2020

(65) Prior Publication Data
US 2022/0217035 A1 Jul. 7, 2022

Related U.S. Application Data

(60) Provisional application No. 62/837,916, filed on Apr. 24, 2019.

(51) Int. Cl.
*H04L 27/34* (2006.01)
*G06N 3/04* (2023.01)
(Continued)

(52) U.S. Cl.
CPC ............... *H04L 27/34* (2013.01); *G06N 3/04* (2013.01); *G06N 3/063* (2013.01); *G06N 3/08* (2013.01); *H04L 27/38* (2013.01)

(58) Field of Classification Search
CPC ............ G06N 3/04; G06N 3/08; G06N 3/063; G06N 20/00; H04B 1/12; H04B 1/16;
(Continued)

(56) References Cited

U.S. PATENT DOCUMENTS

2002/0077151 A1 6/2002 Matthews et al.
2010/0215125 A1 8/2010 Furman
(Continued)

FOREIGN PATENT DOCUMENTS

WO 2020010566 A1 1/2020

OTHER PUBLICATIONS

O'Shea et al., "Convolutional Radio Modulation Recognition Networks;" International Conference on Engineering Applications of Neural Networks; Springer, 2016, 15 pages; arXiv:1602.04105v3 [cs.LG] Jun. 10, 2016.
(Continued)

*Primary Examiner* — Shawkat M Ali
(74) *Attorney, Agent, or Firm* — Verrill Dana, LLP

(57) ABSTRACT

A polymorphic platform for wireless communication systems is provided that employs trained classification techniques to determine physical layer parameters from a transmitter at a receiver. The system includes a learning module to determine transmitted physical layer parameters of the signal using a trained classification module, such as a deep learning neural network. The trained classification module receives I/Q input samples from receiver circuitry and processes the I/Q input samples to determine transmitted physical layer parameters from the transmitter. The system includes a polymorphic processing unit that demodulates data from the signal based on the determined transmitted parameters.

22 Claims, 20 Drawing Sheets

(51) Int. Cl.
*G06N 3/063* (2023.01)
*G06N 3/08* (2023.01)
*H04L 27/38* (2006.01)

(58) Field of Classification Search
CPC .......... H04B 1/26; H04L 12/26; H04L 25/02; H04L 25/03; H04L 25/06; H04L 27/34; H04L 27/38; H04W 48/02; H04W 72/04; H04W 88/04; H04W 84/042
USPC ....... 375/219, 260, 262, 267, 295, 316, 319; 455/313, 446, 561
See application file for complete search history.

(56) References Cited

U.S. PATENT DOCUMENTS

| | | | | |
|---|---|---|---|---|
| 2013/0303099 | A1* | 11/2013 | Kaczman | H04B 1/30 455/226.1 |
| 2015/0092724 | A1 | 4/2015 | Xiao et al. | |
| 2017/0356976 | A1 | 12/2017 | Shapiro et al. | |

OTHER PUBLICATIONS

Karra et al., "Modulation Recognition using Hierarchical Deep Neural Networks;" Proc. of IEEE International Symposium on Dynamic Spectrum Access Networks (DySPAN). Baltimore, MD, USA, 2017; pp. 1-3. doi.org/10.1109/DySPAN. 2017.7920746.

West et al., "Deep Architectures for Modulation Recognition;" Proc. of IEEE International Symposium on Dynamic Spectrum Access Networks (DySPAN); Baltimore, MD, USA, 2017; 7 pages. doi.org/10.1109/DySPAN.2017.7920754. arXiv:1703.09197v1 [cs.LG] Mar. 27, 2017.

Wang et al., "Deep Learning for Wireless Physical Layer: Opportunities and Challenges;" China Communications 14, 11 (2017). 15 pages. arXiv:1710.05312v2 [cs.IT] Oct. 27, 2017.

Kulin et al., "End-to-End Learning From Spectrum Data: A Deep Learning Approach for Wireless Signal Identification in Spectrum Monitoring Applications;" IEEE Access 6 (2018), pp. 18484-18501. https://doi.org/10.1109/ACCESS.2018.2818794.

O'Shea et al., "Over-the-Air Deep Learning Based Radio Signal Classification," IEEE J. Sel. Topics Signal Process., vol. 12, No. 1; Feb. 2018; pp. 168-179.

O'Shea et al., "An Introduction to Deep Learning for the Physical Layer," IEEE Trans. Cogn. Commun. Netw., vol. 3, No. 4, 2017; pp. 563-575.

Restuccia et al., "Big Data Goes Small: Real-Time Spectrum-Driven Embedded Wireless Networking Through Deep Learning in the RF Loop," Proc. of IEEE Conf. on Computer Communications (INFOCOM), 2019; pp. 2152-2160.

Mao et al., "Deep Learning for Intelligent Wireless Networks: A Comprehensive Survey," IEEE Commun. Surveys Tuts., vol. 20, No. 4, Fourth quarter 2018; pp. 2595-2621.

\* cited by examiner

```
polyrf_convnet: top@83c00000 {
    compatible = "xlnx, top-1.0" ;
    reg = <0x83c00000 0x10000>;
    xlnx, s-axi-ctrl-bus-addr-width = <0x4>;
    xlnx, s-axi-ctrl-bus-data-width = <0x20>;
};

axi_bram_ctrl_inp: axi_bram_ctrl@84000000 {
    compatible = "xlnx,axi - bram-ctrl-4.0";
    reg = <0x84000000 0x2000>;
    xlnx,bram-addr-width = <0xb>;
    xlnx, s-axi-ctrl-addr-width = <0x20>;
    xlnx, s-axi-ctrl-data-width = <0x20>;
    xlnx, single-port-bram = <0x1>;
};
```

| 0.00 | 0.00 | 0.00 | 0.00 | 0.00 | 0.01 | 0.11 | 0.19 | 0.81 |
|---|---|---|---|---|---|---|---|---|
| 0.00 | 0.00 | 0.00 | 0.00 | 0.01 | 0.00 | 0.10 | 0.77 | 0.15 |
| 0.00 | 0.00 | 0.00 | 0.00 | 0.00 | 0.00 | 0.77 | 0.01 | 0.02 |
| 0.00 | 0.00 | 0.00 | 0.03 | 0.14 | 0.97 | 0.00 | 0.00 | 0.00 |
| 0.00 | 0.00 | 0.00 | 0.01 | 0.82 | 0.00 | 0.00 | 0.00 | 0.00 |
| 0.01 | 0.00 | 0.00 | 0.95 | 0.02 | 0.01 | 0.01 | 0.02 | 0.01 |
| 0.00 | 0.00 | 0.85 | 0.00 | 0.00 | 0.00 | 0.00 | 0.00 | 0.00 |
| 0.00 | 0.99 | 0.00 | 0.00 | 0.00 | 0.00 | 0.00 | 0.00 | 0.00 |
| 0.99 | 0.01 | 0.14 | 0.01 | 0.01 | 0.00 | 0.00 | 0.00 | 0.00 |

| 0.00 | 0.00 | 0.00 | 0.00 | 0.00 | 0.00 | 0.05 | 0.08 | 0.77 |
|---|---|---|---|---|---|---|---|---|
| 0.00 | 0.00 | 0.00 | 0.00 | 0.00 | 0.00 | 0.02 | 0.90 | 0.22 |
| 0.00 | 0.00 | 0.00 | 0.00 | 0.00 | 0.00 | 0.92 | 0.03 | 0.02 |
| 0.00 | 0.00 | 0.00 | 0.03 | 0.17 | 0.98 | 0.00 | 0.00 | 0.00 |
| 0.00 | 0.00 | 0.00 | 0.01 | 0.81 | 0.01 | 0.00 | 0.00 | 0.00 |
| 0.00 | 0.00 | 0.00 | 0.95 | 0.02 | 0.01 | 0.00 | 0.00 | 0.00 |
| 0.00 | 0.00 | 0.93 | 0.00 | 0.00 | 0.00 | 0.00 | 0.00 | 0.00 |
| 0.00 | 0.99 | 0.06 | 0.00 | 0.00 | 0.00 | 0.00 | 0.00 | 0.00 |
| 1.00 | 0.01 | 0.01 | 0.01 | 0.00 | 0.00 | 0.00 | 0.00 | 0.00 |

*FIG. 18*

DEEP LEARNING-BASED POLYMORPHIC PLATFORM

CROSS REFERENCE TO RELATED APPLICATIONS

This application claims priority under 35 U.S.C. § 119(e) of U.S. Provisional Application No. 62/837,916, filed on 24 Apr. 2019, entitled "Deep Learning-Based Polymorphic Internet of Things Platform," the disclosure of which is hereby incorporated by reference.

STATEMENT REGARDING FEDERALLY SPONSORED RESEARCH OR DEVELOPMENT

This invention was made with Government support under Grant Number N00014-18-9-0001 awarded by the Office of Naval Research. The Government has certain rights in the invention.

BACKGROUND

Today, commercially available Internet of Things (IoT) devices operate according to standardized and inflexible protocols, which is bringing the IoT closer to the spectrum crunch and making IoT communications prone to a variety of wireless attacks. The large number of devices deployed in the IoT increases levels of stress to existing IoT communications. Yet, today's commercial IoT devices still utilize inflexible wireless technologies such as WiFi and Bluetooth, which were designed without having in mind the scale and heterogeneity of the IoT.

SUMMARY

The present technology provides a platform for systems and methods that enable a wireless radio frequency (RF), optical, or acoustic communication system to become polymorphic. That is, a communication system can (i) infer on-the-fly the physical-layer parameters currently used by a transmitter radio; and if needed, (ii) adapt the signal processing chain according to the inferred parameters. The technology can provide an implementation of artificial intelligence to the real-time, dynamic environment of wireless systems, such that communications can be driven by artificial intelligence rather than by pre-defined protocols. The system and methods can be used by a variety of wireless communication systems, such as the Internet of Things (IoT), military communication systems, and civilian communication systems.

More particularly, described herein is the design and evaluation of a polymorphic platform for wireless communication systems, such as for the Internet of Things (IoT). The polymorphic technology can employ a trained classification system that can be, for example, based on a deep learning architecture specifically tailored for the embedded RF domain, which is able to distinguish small-scale transitions in the I/Q domain and thus enables the solution of RF inference problems.

Features include a demonstrated feasibility of polymorphic communications, going beyond inflexibility of existing IoT communications, with substantially improved performance over prior research. The technology can be embedded on off-the-shelf communication platforms.

The present technology can be further summarized by the following list of features:

1. A polymorphic wireless communication system comprising:
   a radio frequency (RF), optical, or acoustic receiver operative to receive signal from a transmitter; and
   a processing system comprising:
   receiver circuitry in communication with the receiver to produce in-phase/quadrature (I/Q) input samples from the signal,
   a learning module operative to determine transmitted physical layer parameters of the signal using a trained classification module operative to receive the I/Q input samples from the receiver circuitry and process the I/Q input samples to determine transmitted physical layer parameters from the transmitter, and
   a polymorphic processing unit including a polymorphic receiver operative to demodulate data from the signal based on the determined transmitted parameters.
2. The system of feature 1, wherein the learning module is operative to arrange the I/Q input samples in an I/Q complex plane.
3. The system of any of features 1-2, wherein the trained classification module is trained to recognize I/Q patterns in the I/Q complex plane.
4. The system of any of features 1-3, wherein the trained classification module is trained to recognize transitions between occurrences of the I/Q input samples in an I/Q complex plane.
5. The system of any of features 1-4, wherein the polymorphic processing unit is operative to determine a modulation scheme of the transmitter from recognized transitions between the occurrences of the I/Q input samples in an I/Q complex plane.
6. The system of any of features 1-5, wherein the learning module is operative to produce a probability distribution of parameter sets of the transmitter, and the polymorphic processing unit is operative to select one of the parameters sets with a highest probability.
7. The system of any of features 1-6, wherein the trained classification module is configured to carry out operations concurrently in loops and/or in a pipeline.
8. The system of any of features 1-7, wherein the receiver circuitry is operative to transmit a stream of the I/Q input samples to a data storage buffer for transmission at a controlled rate to the learning module.
9. The system of any of features 1-8, wherein the polymorphic processing unit is in communication with the data storage buffer to receive the I/Q input samples for demodulation based on the determined transmitted physical layer parameters.
10. The system of any of features 1-9, wherein the polymorphic processing unit is operative to alter a configuration of a receiver chain based on the determined transmitted physical layer parameters to demodulate the data.
11. The system of any of features 1-10, wherein the trained classification module comprises a deep learning neural network including a plurality of layers and is operative to process the I/Q input samples through the layers to determine the transmitted physical layer parameters.
12. The system of any of features 1-11, wherein the trained classification module comprises a convolutional neural network, a multi-layer perceptron, a feedforward network, or a support vector machine.

13. The system of any of features 1-12, wherein the layers include one or more of a convolution layer, a dense layer, a fully-connected layer, a rectified linear layer, and a pooling layer.
14. The system of any of features 1-13, wherein the processing system is operative to configure each layer with one or more of a weight, filter, bias, or activation function.
15. The system of any of features 1-14, wherein the processing system is operative to reconfigure the trained classification module operate with one or more of a different weight or filter to change a property that is classified.
16. The system of any of features 1-15, wherein the learning module comprises learning circuitry including one or more logic devices.
17. The system of any of features 1-16, wherein the one or more logic devices include one or more of a field programmable gate array (FPGA), application specific integrated circuit (ASIC), complex programmable logic device (CPLD), small-scale integrated circuit, programmable logic array, programmable logic device, and masked-programmed gate array.
18. The system of any of features 1-17, wherein the determined physical layer parameters include one or more of a symbol modulation scheme, frequency value, phase value, amplitude value, symbol modulation rate, fast Fourier transform size, carrier frequency, bandwidth, frequency resolution, number of carriers, and bandwidth of carriers.
19. The system of any of features 1-18, wherein the processing system is operative to determine transmitted physical layer parameters from signals transmitted using a digital modulation scheme comprising phase-shift keying, binary phase-shift keying, quadrature phase-shift keying, 8-phase-shift keying, 16-phase-shift keying, frequency-shift keying, amplitude-shift keying, quadrature amplitude modulation, or orthogonal frequency division multiplexing.
20. The system of any of features 1-19, wherein the receiver comprises an RF receiver.
21. The system of any of features 1-20, further comprising a transmitter operative to alter one or more physical layer parameters for transmission of a signal, the parameters including one or more of carrier frequency, FFT size and symbol modulation.
22. The system of any of features 1-21, wherein the receiver circuitry produces the I/Q input samples at sampling rate that is greater than a sampling rate used by the transmitter in transmitting the RF signals.
23. The system of any of features 1-22, wherein the processing system is operative to determine the transmitted physical layer parameters with a latency less than a switching rate of the transmitter to switch a configuration of the physical layer parameters for transmission.
24. The system of any of features 1-23, wherein the transmitter comprises an RF transmitter.
25. A method of polymorphic wireless communication using the system of any of features 1-24, comprising: receiving a signal from the transmitter at the receiver; determining the transmitted physical layer parameters of the signal; and demodulating data from the signal based on the determined transmitted physical layer parameters.

DESCRIPTION OF THE DRAWINGS

Reference is made to the following detailed description taken in conjunction with the accompanying drawings in which:

FIG. 10 is an illustration of device tree entries for the input BRAM and the convolutional neural network peripherals.

FIG. 18 is an illustration of confusion matrices for the polymorphic OFDM system of LOS (left) and NLOS (right) scenarios.

DETAILED DESCRIPTION

For wireless communication systems, a security concern in that, by leveraging the inflexible characteristics of existing wireless protocols, jamming strategies targeting key components of the wireless transmission, such as headers and pilots, can significantly decrease the system throughput and increase the jammer stealthiness. For example, pilot nulling attacks in OFDM systems can be up to 7.5 dB more effective than traditional jamming. Moreover, through careful selection of jamming period and duration, a jammer with a 4% duty cycle is able to lower the IEEE 802.15.4 packet delivery ratio to only 5%. As described herein, these attacks can be mitigated, if not completely addressed, by allowing the transmitter to dynamically switch parameters such as carrier frequency, FFT size, and symbol modulation without coordination with the receiver. This can make the position of headers and pilots change over time without creating jamming-prone control channels/headers.

Figure 1:
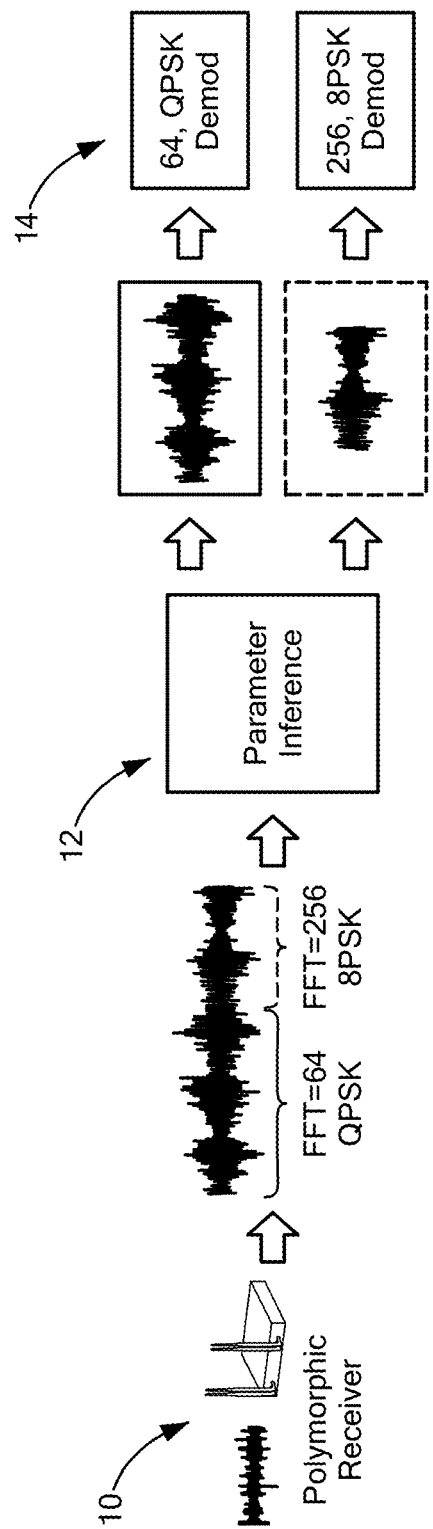
FIG. 1 is a schematic example of a polymorphic wireless system.

The present technology accordingly provides polymorphic wireless radio frequency (RF), optical, and acoustic communication systems to address such issue. As described herein, polymorphism can concretely realize a minimalistic, protocol-free, inference-based, on-the-fly approach to wireless communications, where transmitters and receivers operate using a very limited set of basic rules (e.g., set of modulations) which are seamlessly changed by the transmitter at will without using control channels or headers. The receiver, in turn, can infer the parameters using trained classification techniques or machine learning techniques, and then "morphs" itself into a new configuration to demodulate the data. FIG. 1 shows an example of a polymorphic OFDM receiver 10 able to infer a current transmitter's FFT and symbol modulation parameters, 12, and then demodulate each portion of the received signal, 14, according to the inferred parameters.

The technology has application in a variety of wireless communication systems, such as IoT communication systems, Internet of medical things communication systems, military communication systems, and civilian communication systems.

The technology is described herein in conjunction with RF communication systems. However, features and embodiments can be applied to optical and acoustic communication systems as well.

Switching parameters by the transmitter. An aspect of the implementation of a polymorphic wireless system is the on-the-fly inference of the physical-layer parameters currently used by the transmitter. In practical systems, however, the transmitter may choose to switch its parameter configuration on the order of milliseconds. For example, if the transmitter chooses to switch parameters every 100 ms, the learning model latency should be less than 100 ms (described further below in Section 3.2) to predict the parameters and morph the receiver into a new configuration. These strict constraints cannot be met with software running in a CPU; as shown in Section 4.3 below, CPU latency is several orders of magnitude greater than what is required to sustain realistic sampling rates from the RF interface. To address this issue, the present technology can leverage the parallelism of hardware-based designs and implement knowledge extraction techniques that operate with fixed, low latency.

Creating learning architectures for the embedded RF domain. Deep learning neural networks such as convolutional neural networks (sometimes termed "ConvNets" herein for convenience) can be applied to analyze RF data without feature extraction and selection algorithms. Convolutional neural networks present a number of characteristics (discussed in Section 2) that make them particularly desirable from a hardware implementation perspective. However, these solutions cannot be applied to implement real-time polymorphic IoT systems—as shown in Section 4.3, existing prior art utilizes general-purpose architectures with a very high number of parameters, requiring hardware resources and latency that go beyond what is acceptable in the embedded RF domain. This issue, coupled with the learning challenges of the RF domain (discussed in Section 2) calls for RF-specific, real-time architectures. The present technology provides learning systems that that can operate in a real-time wireless environment and implement inference-based wireless systems.

Proving the feasibility of polymorphic IoT wireless communications. The present technology addresses the feasibility and effectiveness of wireless polymorphism, particularly on a resource-constrained IoT platform. From a system perspective, this requires a tight interconnection between traditionally separated components, such as CPU, RF front-end, and embedded operating system/kernel, to form a seamlessly-running low-latency learning architecture closely interacting with the RF components and able to adapt at will its hardware and software based on RF-based inference. Furthermore, since polymorphic IoT systems are subject to inference errors, its performance has been tested against a perfect-knowledge (thus, ideal and not implementable) system, described further below.

Thus, described herein is the design, implementation, and performance evaluation of a deep learning-based polymorphic wireless technology for an IoT or other wireless platform. In particular, demonstrated herein is the feasibility of an inference-based approach to wireless IoT communications as well as that this approach can be embedded in IoT devices and applied to address practical IoT communication problems.

The polymorphic wireless technology can provide features such as the following: A convolutional neural network-based learning architecture (sometimes termed "RFNet" here for convenience) can be provided for the embedded RF domain. A feature of the RF learning architecture is to arrange I/Q samples to form an "image" that can be effectively analyzed by the convolutional neural networks filters. This operation can produce high-dimensional representations of small-scale transition in the I/Q complex plane, which can be leveraged to efficiently solve a wide variety of complex RF classification problems such as RF modulation classification. Extensive experimental evaluation on a single-carrier RF inference problem indicated that the RF learning architecture achieved 14% more accuracy with respect to prior art, while reducing latency and hardware consumption by 52× and 8×, respectively.

1. Polymorphic RF System Overview

Figure 2:
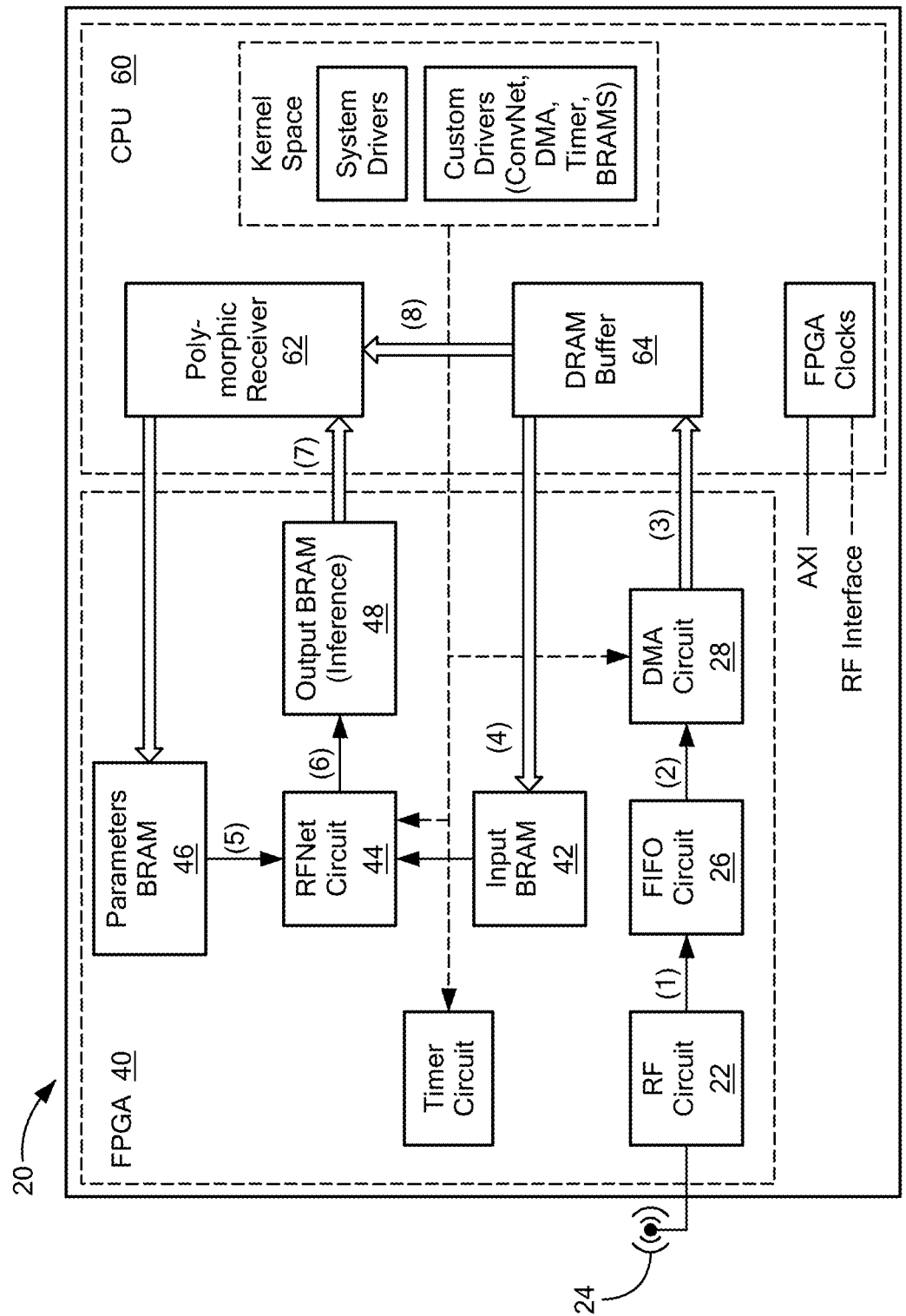
FIG. 2 is a block diagram of the main components of a polymorphic RF platform. Depicted in dashed, thick, and thin arrows are AXI-Lite, AXI-Full and AXI-Stream interfaces, respectively.

A high level summary of the primary blocks and operations performed by a polymorphic RF system are described with reference to FIG. 2. Briefly, the polymorphic RF system 20 can be considered as a learning-based software-defined radio architecture where both the inference system and the demodulation strategy can be morphed into new configurations at will. The system can include a receiver including an antenna to receive signals from a transmitter and a processing system. The processing system can including receiver circuitry in communication with the receiver to produce in-phase/quadrature (I/Q) input samples from the signal, a learning module 40 to determine transmitted physical layer parameters of the signal using a trained classification module operative to receive the I/Q input samples from the receiver circuitry and process the I/Q input samples to determine transmitted physical layer parameters from the transmitter, and a polymorphic processing unit 60 including a polymorphic receiver 62 operative to demodulate data from the signal based on the determined transmitted parameters.

Platform hardware and interfaces. The polymorphic system's architectural components can reside in the processing system 20 and the programmable logic portions of a system-on-chip (SoC), which is an integrated circuit (also known as "IC" or "chip") that integrates components of a computer, i.e., central processing unit (CPU), FPGA or other logic devices, random access memory (RAM), input/output (I/O) ports and secondary storage, on a single substrate. SoCs are useful due to their low power consumption and because they allow the design and implementation of customized hardware on logic devices, such as a field-programmable gate array (FPGA) portion of the chip, also called programmable logic. Furthermore, SoCs can bring flexibility to the polymorphic system, as the programmable logic can be reprogrammed at will according to the desired learning design. The programmable logic portion of the SoC can be managed by the processing system, i.e., the CPU, RAM, and associated buses. In an example, a polymorphic system can be built based on off-the-shelf equipment. A Linux or other operating system can be used.

For both intra-FPGA and FPGA-CPU data exchange, an Advanced eXtensible Interface (AXI) bus specification can be used to exchange data. In the AXI standard, data can be exchanged during read or write transactions. In each transaction, the AXI master can be charged with initiating the transfer; the AXI slave, in turn, can be tasked with responding to the AXI master with the result of the transaction (i.e., success/failure). An AXI master can have multiple AXI slaves, and vice versa, according to the specific FPGA design. Multiple AXI masters/slaves can communicate with each other by using AXI interconnects. Specifically, AXI-Lite can be used for register access and to configure the circuits inside the FPGA, while AXI-Stream can be used to transport high-bandwidth streaming data inside the FPGA. AXI-Full can be instead used by the CPU to read/write consecutive memory locations from/to the FPGA. Any other communication interface suitable for handling large data transfers can be also used.

1.1 Polymorphic RF System Operations

Operations performed by the polymorphic RF system are described by reference to FIG. 2. For simplicity, specific hardware equipment and circuits are called out in the description; however, it will be appreciated that the building blocks of the platform design (BRAMs, DMA, FIFOs, etc.) can be implemented in a variety of ways, including in any commercially-available FPGA platform.

In the description herein, it is assumed that the transmitter may transmit by choosing among a discrete set of physical-layer parameters that are known at the receiver's side. Define as Y a tuple of such physical-layer parameters, which may be changed at will by the transmitter but not before $T_{sw}$ seconds between each change, referred to as a switching time. For the sake of generality, this description does not assume any particular strategy in the transmitter's parameter choice, which can be driven by a series of factors (including anti jamming strategy, noise avoidance, throughput optimization, and so on), as the present description is focused mainly on the receiver's side. Reconfigurable RF Front-end. The RF signal is thus transmitted and received (step 1) through an RF interface 22, which can include, for example, an antenna 24 and other circuitry including an analog to digital converter (ADC). The RF interface can be a reconfigurable RF front-end. For example, the RF interface can include a local oscillator (LO) with frequency and RF bandwidth that can be reconfigurable at will through CPU registers. In one example, an AD9361 RF interface commercially available from Analog Devices is suitable, as it is commonly used in software-defined radio systems. The AD9361 has a supporting frequency range between 70 MHz to 6.0 GHz and channel bandwidth between 200 kHz to 56 MHz. Also, Analog Devices provides basic FPGA reference designs and kernel-space drivers to ease implementation and extensions, and the AD9361 local oscillator (LO) frequency and RF bandwidth can be reconfigured at will through CPU registers.

Conversion from RF to AXI domain and DMA. The RF interface can produce streams of I/Q samples at a particular rate that can be too fast for the other circuits in the FPGA. For example, the AD9361 produces streams of I/Q samples of 200M samples/second—hence, it is clocked at 200 MHz. Accordingly, an AXI FIFO 26 can be implemented to adapt the speed of samples from the RF interface to the clock frequency, for example, 100 MHz, used by the other circuits in the FPGA (step 2). A direct memory access (DMA) core 28 can be used to store the stream of I/Q samples to a buffer 64 in the DRAM (step 3). The use of DMA can be advantageous as the CPU cannot do the transfer itself, since it would be fully occupied for the entire duration of the read/write operation, and thus unavailable to perform other work. Therefore, a custom DMA driver can be provided to periodically fill a buffer of size B residing in the DRAM with a subset of I/Q samples coming from the FIFO.

Learning and Receiver Polymorphism. After the buffer has been replenished, its first X I/Q samples are sent through, for example, AXI-Full to a block random access memory (BRAM) 42 (step 4) constituting the input to RF learning circuitry 44. The learning architecture can be based on, for example, convolutional neural networks (ConvNets). Sections 2 and 3 below discuss in greater detail its architecture and implementation, respectively. The parameters of the RF learning architecture are read by an additional BRAM 46
(step 5), which in effect allows the reconfiguration of the RF learning architecture to address multiple RF problems according to the current platform need. As explained further in Section 2 below, the RF learning architecture produces a probability distribution over the transmitter's parameter set Y. After the RF learning architecture has inferred the transmitter's parameters, it writes on a block-RAM (BRAM) 48 its probability distribution (step 6). Then, the polymorphic receiver 62 reads the distribution from the BRAM (step 7), selects the parameter set with highest probability, and "morphs" accordingly into a new configuration to demodulate all the I/Q samples contained in B (step 8).

2. The RFNet Architecture

Overview of Convolutional Neural Networks. Boldface upper and lower-case letters are used herein to denote matrices and column vectors, respectively. For a vector x, $x_i$ denotes the i-th element, |x| indicates the Euclidean norm, $x^T$ its transpose, and x·y the inner product of x and y. For a matrix H, $H_{ij}$ indicates the (i,j)-th element of H. The notation $\mathcal{R}$ and $\mathcal{C}$ indicate the set of real and complex numbers, respectively.

Deep neural networks are mostly implemented as multi-layer perceptrons (MLPs). More formally, an MLP with L layers is formally defined as a mapping $f(x_i; \theta): \mathcal{R}^i \to \mathcal{R}^o$ of an input vector $x_i \in \mathcal{R}^i$ to an output vector $x_1 \in \mathcal{R}^o$. The mapping happens through L subsequent transformations, as follows:

$$r_j = f_j(r_{j-1}, \theta_j) \quad 0 \leq j \leq L$$

where $f_j(r_{j-1}, \theta_j)$ is the mapping carried out by the j-th layer. The vector $\theta = \{\theta_1, \ldots, \theta_L\}$ defines the whole set of parameters of the MLP.

A layer is said to be fully-connected (FCL) or dense if $f_j$ has the form $$f(r_{j-1}, \theta_j) = \sigma(W_j \cdot r_{j-1} + b_j)$$

where $\sigma$ is an activation function, $W_j$ is the weight matrix and $b_j$ is the bias vector. This function introduces a non-linearity in the mapping processing, which allows for ever complex mappings as multiple layers are stacked on top of each other. Examples of activation functions are linear, i.e., $\sigma(x)_i = x_i$, rectified linear unit (RLU), i.e., $\sigma(x)_i = \max(0, x_i)$, and so on. Deep neural networks are generally trained using labeled training data, i.e., a set of input-output vector pairs $(x_{0,i}, x^*_{L,i})$, $1 \leq I \leq |S|$, where $x^*_{L,i}$ is the desired output of the neural network when $x_{0,i}$ is used as input.

Differently from dense layers (DL), convolutional layers (CVL) examine adjacent inputs together. Convolutional layers (CVLs) address the lack of scalability of fully-connected layers (FCLs) by binding adjacent shifts of the same weights together similar to a filter sliding across an input vector. More formally, a CVL has a set of F filters $\mathcal{Q}_f \in \mathbb{R}^{h \times w}$, $1 \leq f \leq F$, where F is also called the layer depth. Each filter generates a feature map $Y^f \in \mathbb{R}^{n' \times m'}$ from an input matrix $X \in \mathbb{R}^{n \times m}$ according to the following:

$$Y^f_{i,j} = \sum_{k=0}^{h-1} \sum_{\ell=0}^{w-1} Q^f_{h-k, w-\ell} \cdot X_{1+s \cdot (i-1)-k, 1+s \cdot (j-1)-\ell} \quad (1)$$

where $s \geq 1$ is an integer parameter called stride, $n' = 1 + [n+h-2]$ and $m' = 1 + [m+b-2]$. The matrix X is assumed to be padded with zeros, i.e., $X_{ij} = 0 \; \forall i \notin [1, n], j \notin [1, m]$. To introduce non-linearities in the model, convolutional operations are usually followed by a rectified-linear (RLL) layer and a pooling layer (POL). The POL computes a single value out of $p \times p$ regions of Y, usually maximum or average value.

CNNs are commonly made up of only four layer types: convolutional (CVL or ConvNet), pooling (POL), fully-connected (FCL), and rectified-linear (RLL). The most common CNN architectures stack a number of CVL-RLL layers, (optionally) followed by POL layers, and repeat this pattern until the input has been merged spatially to a small size. At some point, it is common to transition to FCLs, with the last FCL holding the output (i.e., the classification output). The most common CNN architectures follow the pattern below:

$$IN \to \underbrace{[\underbrace{[CVL \to RLL]}_{1 \dots M} \to \overbrace{POL}^{0 \dots P}]}_{} \to \underbrace{[DL \to RLL]}_{1 \dots K} \to DL$$

where N, M and K are chosen according to the specific classification problem.

There are several advantages, both theoretical and practical, that can make the usage of convolutional neural network-based models useful for the embedded RF domain. First, convolutional filters are designed to interact only with a very small portion of the input. As shown in Section 4.1, this property allows the achievement of significantly higher accuracy than traditional neural networks. Also, convolutional neural networks are scalable with the input size. For example, for a 200×200 input and a DL with 10 neurons, a traditional neural network has $200^2 \cdot 10 = 400$ k weights, which implies a memory occupation of $4 \cdot 400$ k=16 Mbytes to store the weights of a single layer (i.e., a float number of each weight). Clearly, this is unacceptable for the embedded domain, as the network memory consumption would become intractable as soon as several DLs are stacked on top of the other. Moreover, as shown in Section 3.2 below, convolutional neural network filtering operations can be made low-latency by parallelization, which makes them particularly suitable to be optimized for the RF domain. Finally, as show in Section 4 below, the same convolutional neural network architectures can be reused to address different RF classification problems (e.g., modulation classification in single- and multi-carrier systems), as long as the convolutional neural network is provided appropriate weights through training. The convolutional neural networks hardware design (Section 3.1) has been specifically designed to allow seamless convolutional neural network reconfiguration and thus solving different RF problems according to the system's needs.

RF-Specific Learning Considerations. There are a number of challenges in RF learning that are substantially absent in the CV domain. Among others, RF signals are continuously subject to dynamic (and usually unpredictable) noise/interference coming from various sources, which makes RF learning problems non-stationary. Therefore, the learning system can be designed to be resilient to noise. Moreover, some RF signals are by default very "similar" to each other. For example, portions of a QPSK transmission could be mistaken for 8PSK transmissions since they share part of their constellations, and with noise/fading, 32-QAM signals can be mistaken for 16- or 64-QAM signals. These issues can be addressed with the following features. First, although RF signals are affected by fading/noise, in most practical cases their effect can be considered as constant over small intervals. Second, though some constellations are similar to each other, the transitions between the symbols of the constellations are distinguishable when the waveform is sampled at a higher sampling rate than the one used by the transmitter. Third, convolution operations are equivariant to translation. This means that filters can be trained to recognize I/Q patterns regardless of where they occur in the waveform.

RF Learning Architecture. By leveraging these concepts, a learning system can be designed that distinguishes waveforms by recognizing transitions in the I/Q complex plane regardless of where they happen, by leveraging the shift-invariance property of convolutional layers. More formally, consider a discrete-time complex-valued I/Q sequence s[k], where $k \geq 0$. Consider M=W·H consecutive I/Q samples s[j], $0 \leq j \leq W \cdot H$, where W and H are the width and height of the input tensor. The input tensor $\mathcal{T}$, of dimension W×H×2, is constructed as follows:

$$\mathcal{T}[r, c, d] = \text{Re}\{s[r \cdot W + c]\} \cdot (1 - d) + \text{Im}\{s[r \cdot W + c]\} \cdot d, \quad (2)$$

$$\text{where } d \in \{0, 1\}, 0 \leq r \leq H, 0 \leq c \leq W$$

Figure 3:
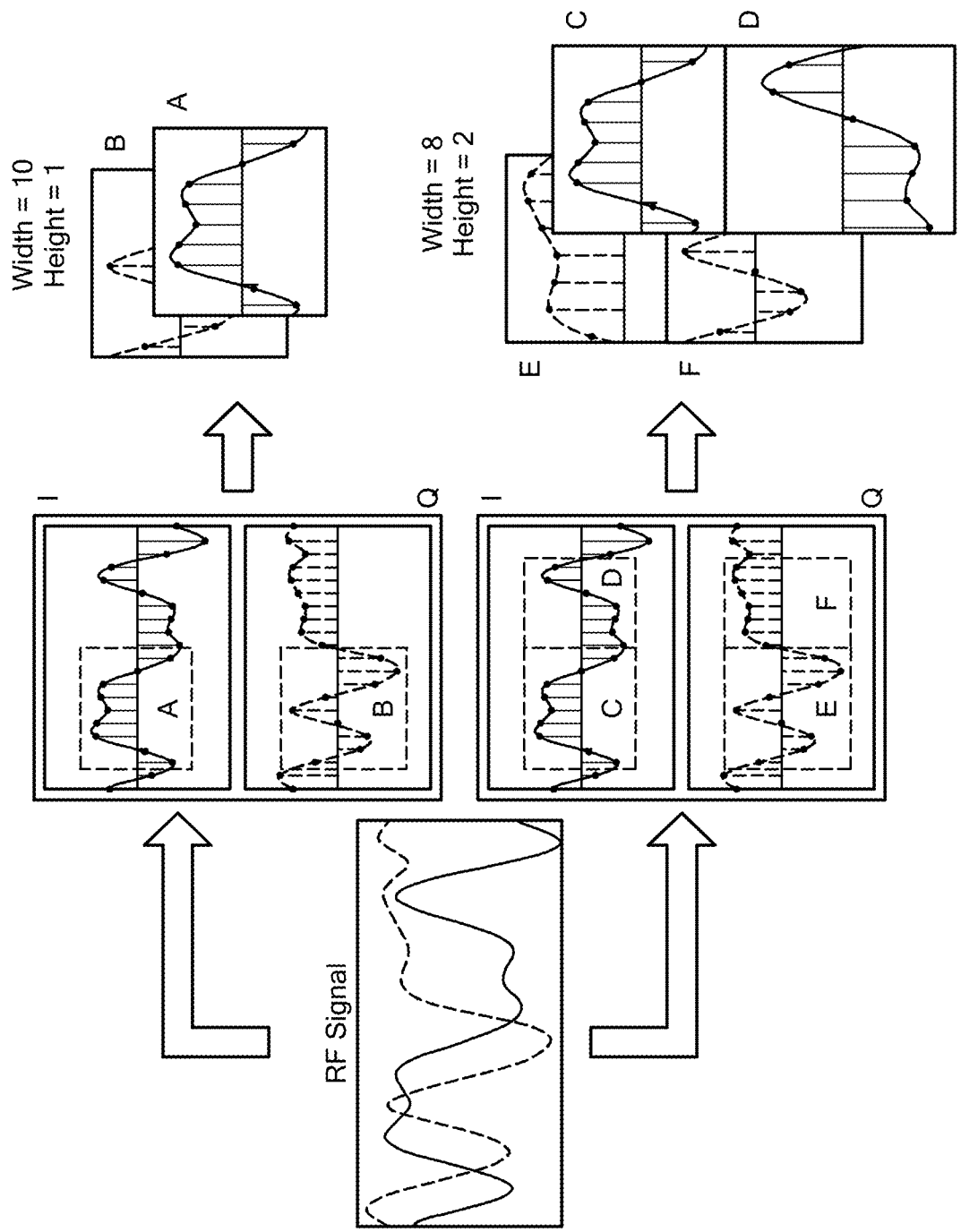
FIG. 3 is a schematic illustration of a construction of W×H×2 tensors by (i) creating two different channels for I and Q streams; and (ii) stacking H columns of W I/Q samples.
Figure 4:
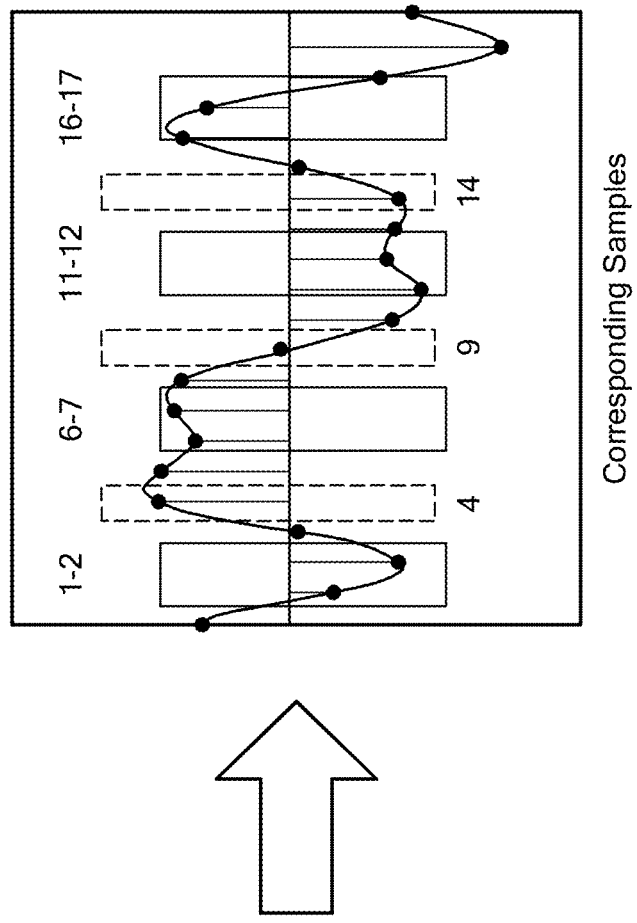
FIG. 4 is an illustration of capturing small-scale I/Q pattern sequences in the RF signal.

By construction, it follows that $\mathcal{T}[r+1, c] = s[(r+1) \cdot W + c] = s[r \cdot W + c + W]$, meaning that (i) I/Q samples in adjacent columns will be spaced in time by a factor of 1, and (ii) I/Q samples in adjacent rows will be spaced in time by a factor of W; moreover, (iii) the input tensors have depth equal to 2, corresponding to the I and Q data, respectively, which allows the RF learning architecture filters to examine each element of the input tensor without decoupling the I and Q components of the RF waveform. FIG. 3 depicts an example of 2×4 and 1×3 filters operating on a waveform.

Figure 5:
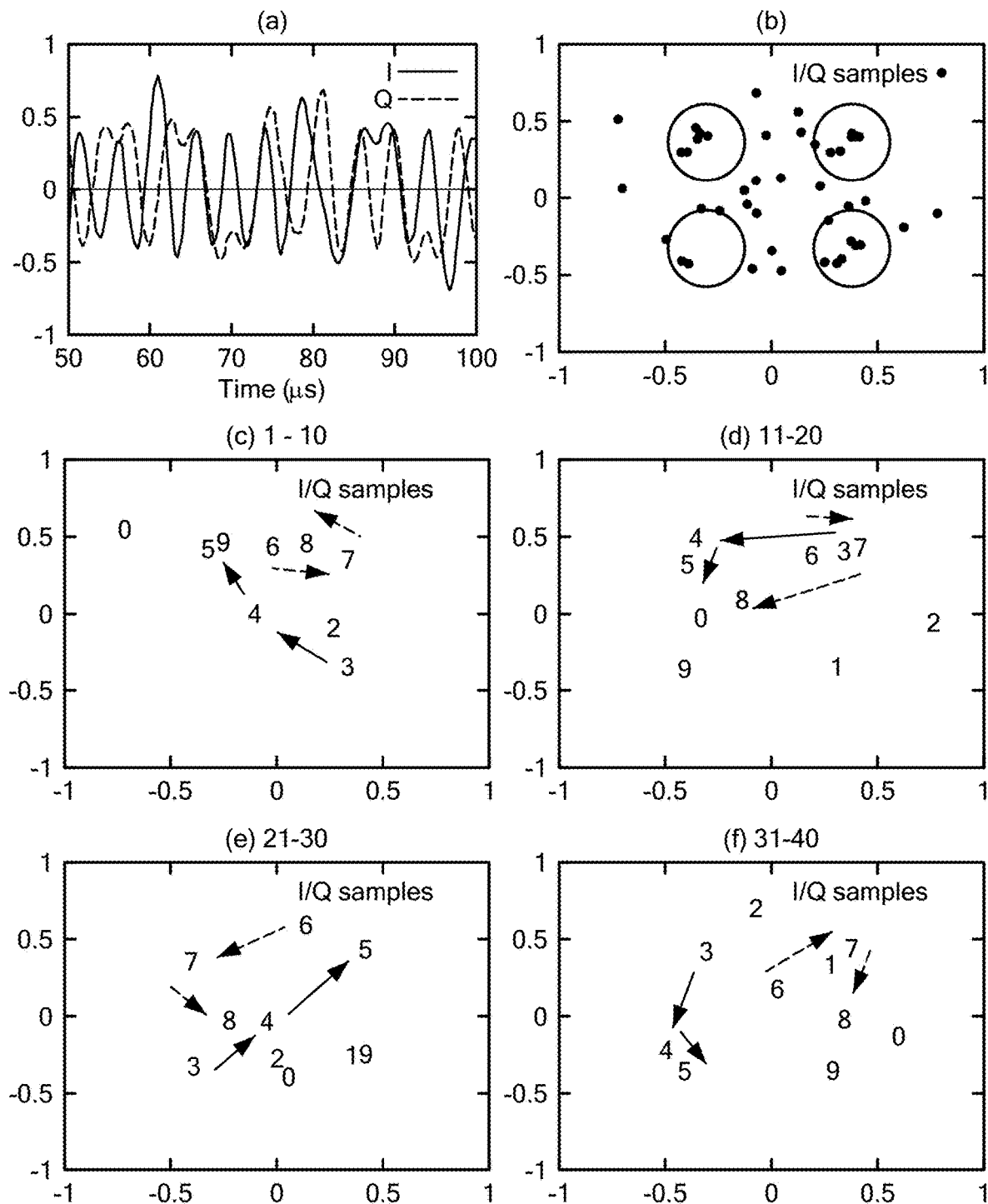
FIG. 5 is an example of I/Q patterns in a QPSK waveform.

To further show the considerations behind the architectural design, FIGS. 5(c)-(f) show the first 40 I/Q samples (ordered by occurrence) of a QPSK waveform in FIG. 5(a) which corresponds to the I/Q constellation shown in FIG. 5(b), where the transmitter and receiver sampling rates are set to 1M and 10M samples/sec, respectively. Consider an example where 3×3 filters are used, with W=10 and H=4. By setting W equal to the sampling rate, the consecutive rows of the filter can be "forced" to recognize transitions occurring in the same portion of the symbol transmitted by the receiver. To make this point, solid (red) and dashed (blue) arrows show the I/Q transitions "seen" by a filter applied at indices 3-4-5 and 6-7-8, respectively. While in the former case the transitions between the I/Q constellation points peculiar to QPSK can be clearly recognized, in the latter case the filter does not recognize patterns. This is because samples 3-4-5 are in between QPSK constellation points, while 7-8-9 are close to the actual QPSK constellation.

3. PolyRF: Hardware and Drivers

Hardware and driver design and implementation of the polymorphic system are described in this section. A design, hardware implementation and main operations of RF learning architecture are described in Section 3.1, followed by a discussion of the parallelization strategies in Section 3.2 and of the drivers implemented to operate the circuits in Section 3.3.

3.1 RFNet: Architecture and Operations

Design Considerations. One of the design issues to address is ensuring that the same RF learning architecture can be reused for multiple learning problems and not just one architecture. For example, the wireless node might want to classify only specific properties of an RF waveform, e.g., classify only modulation since the FFT size is already known. This requires reconfigurability of the model parameters, as the device's hardware constraints may not be able to accommodate multiple learning architectures. In other words, the RF learning architecture can operate with a different set of filters and weight parameters according to the circumstances. For this reason, in some examples, high-level synthesis (HLS) has been used to design a library that translates a Keras-compliant RF learning architecture into an FPGA-compliant circuit. HLS is an automated design process that interprets an algorithmic description of a desired behavior (e.g., C/C++) and creates a model written in hardware description language (HDL) that can be executed by the FPGA and implements the desired behavior.

Figure 6:
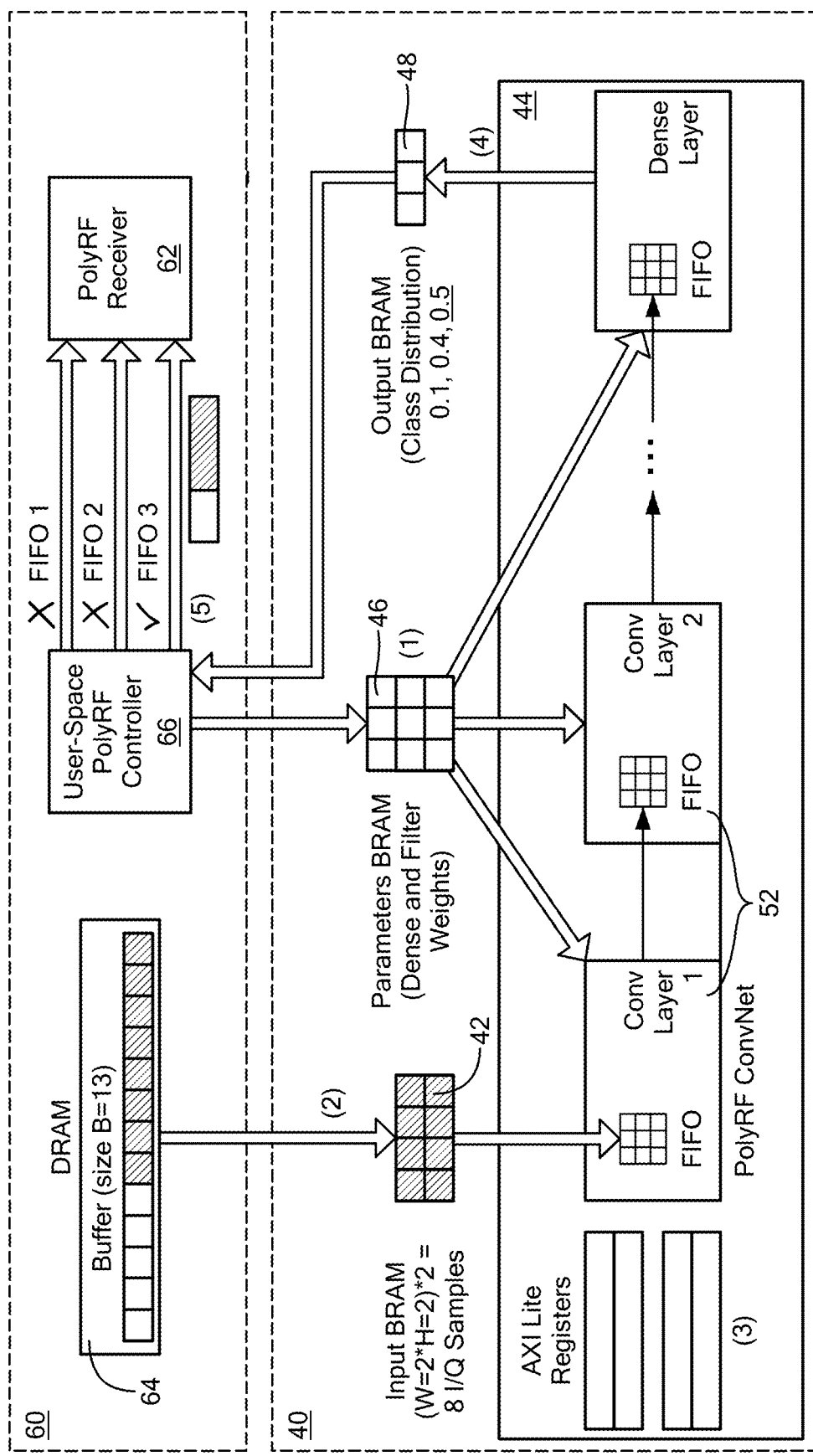
FIG. 6 is a block illustration of a learning circuit.

Design and Implementation. FIG. 6 shows a block scheme of the HLS-based RF learning circuitry 44 and its main interactions with the CPU and other FPGA components. An example with some numbers is also provided to ease presentation. The RF learning circuitry implementation can be modular, such that the circuits implementing each layer are independent from each other, which allows for ease of parallelization and transition from HLS to HDL. Consecutive layers 52 in the RF learning circuitry exchange data through high-speed AXI-Stream interfaces that then store the results of each layer in a FIFO, read by the next layer. The architecture uses a 32-bit fixed-point representation for real numbers, with 10 bits dedicated to the integer portion. Fixed-point instead of floating-point can decrease significantly the computation and hardware architecture complexity, as the precision of floating-point arithmetic is not needed. This implementation can also clearly separate the computation from the parameters, which allows for seamless real-time reconfigurability. This is achieved by writing the parameters in a BRAM which is both accessible by the CPU and by the RF learning circuitry.

Main Operations. The first operation is to write the RF learning parameters into a BRAM through a user-space polymorphic system controller 66 (step 1). These parameters are the weights of the convolutional layer filters and the weights of the dense layers. Since a fixed-point architecture can be used, each parameter can be converted into fixed-point representation before being written to the BRAM. As soon as a new input buffer B (of size 13 in this example) has been replenished, the controller writes the input (the first 8 I/Q samples in this example) into the input BRAM 42 (step 2). RF learning operations are then started by writing into an AXI-Lite register (step 3) through a customized kernel-level Linux driver. Once the results have been written in the output BRAM 48 (step 4), the RF learning architecture writes an acknowledgement bit into another AXI-Lite register, which signals the controller that the output is ready. Then, the controller reads the output (in this example, class 3 has the highest probability), and sends the entire buffer B through a Linux FIFO to the polymorphic system receiver 62 (step 5), which can be implemented, for example, in Gnuradio software. The receiver has different FIFOs, each for a parameter set. Whenever a FIFO gets replenished, the part of the flowgraph corresponding to that parameter set activates and demodulates the I/Q samples contained in the buffer B. Notice that for efficiency reasons the receiver chains do not run when the FIFO is empty; therefore only one receiver chain can be active at a time.

3.2 RFNet: Latency Optimization

In Section 4.3 below, it is shown that the above implementation on the average reduces the latency by about 95% with respect to a model implemented in the CPU. However, in some cases, this performance may not be enough to sustain the flow of I/Q samples coming from the RF interface. Some formulas are derived to explain this point.

Latency Optimization. Suppose that the RF interface is receiving samples at S samples/sec. The RF interface quantizes I/Q samples using a 16-bit ADC, so each I/Q sample occupies 4 bytes. Therefore, the system needs to process data with throughput 4×S MB/sec to keep up with the sampling rate. To process 4·S MB of I/Q data, polymorphic system must do the following: (i) insert B×8 bytes into the DRAM through DMA; (ii) transfer the first W·H samples to the input BRAM; (iii) execute the RF learning; (iv) read the inference from the output BRAM, for a total of (4·S)/(B·8)= S/(B·2) times. More formally, by defining the above quantities as $T_{buf}$, $T_i$, $T_{cn}$, and $T_o$, it must hold that $(T_{buf}+T_i+T_{cn}+T_o) \cdot ((4 \cdot S)/(B \cdot 8)) < 1$. Since the measurements show that $T_{buf}$, $T_i$, $T_o \ll T_{cn}$ then:

$$T_{cn} < 2 \cdot B/S \qquad (3)$$

Since sampling rate S is usually fixed, to make Eq. 3 hold, then either (i) the buffer size B must be increased, or (ii) the RF learning latency $T_{cn}$ must be decreased. Increasing the buffer size B is not desirable since an increase in buffer size implies a decrease in switching time $T_{sw}$. To give a perspective of the order of magnitude of these quantities, in the experiments S=5 MS/s and $T_{cn} \cong 16$ ms. This implies that the buffer size B must be greater than 40,000 I/Q samples for the system to work correctly, implying that RF learning inference must be valid for at least 40,000 I/Q samples, which corresponds to a switching time $T_{sw}$=8 ms.

Figure 7:
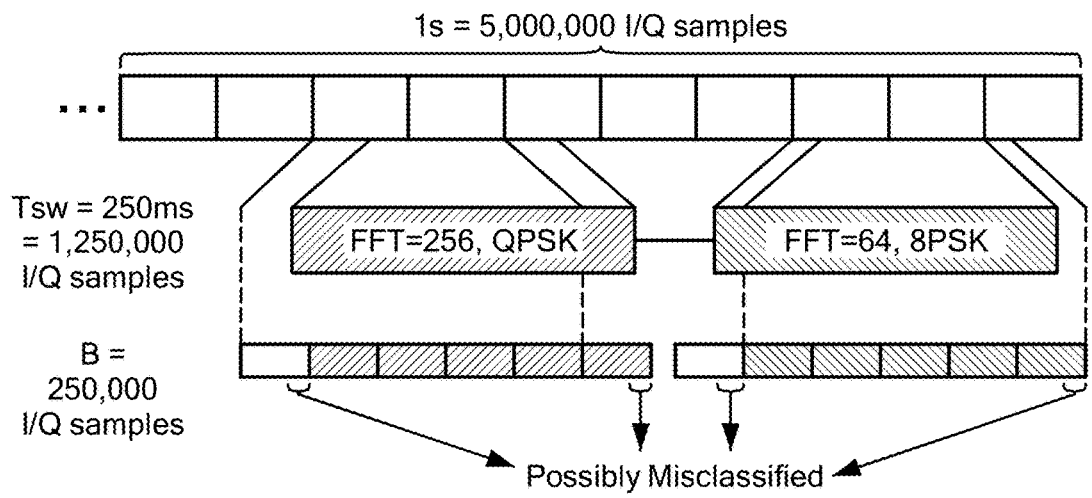
FIG. 7 is an illustration of switching time vs. buffer size.

The calculation above assumes that it only suffices to run the model once every switching time. However, since the receiver is not aligned with the switching time, the RF learning architecture must be run several times to obtain good performance. To help make this point, FIG. 7 shows an example where some of the I/Q samples may be misclassified due to misalignment. It can be shown that the amount of I/Q samples that can be misclassified due to misalignment is approximately B/2 on the average, assuming all classes are equally distributed (a more precise computation would involve knowing the number of classes and their distribution). In general, having a smaller buffer B is desirable as it necessarily leads to less misclassifications. The trade-off here, however, is that a smaller B implies running the RF learning more frequently, which can lead to increased CPU usage. In the experiments, the RF learning was run five times per switching time, as shown in FIG. 7.

Figure 8:
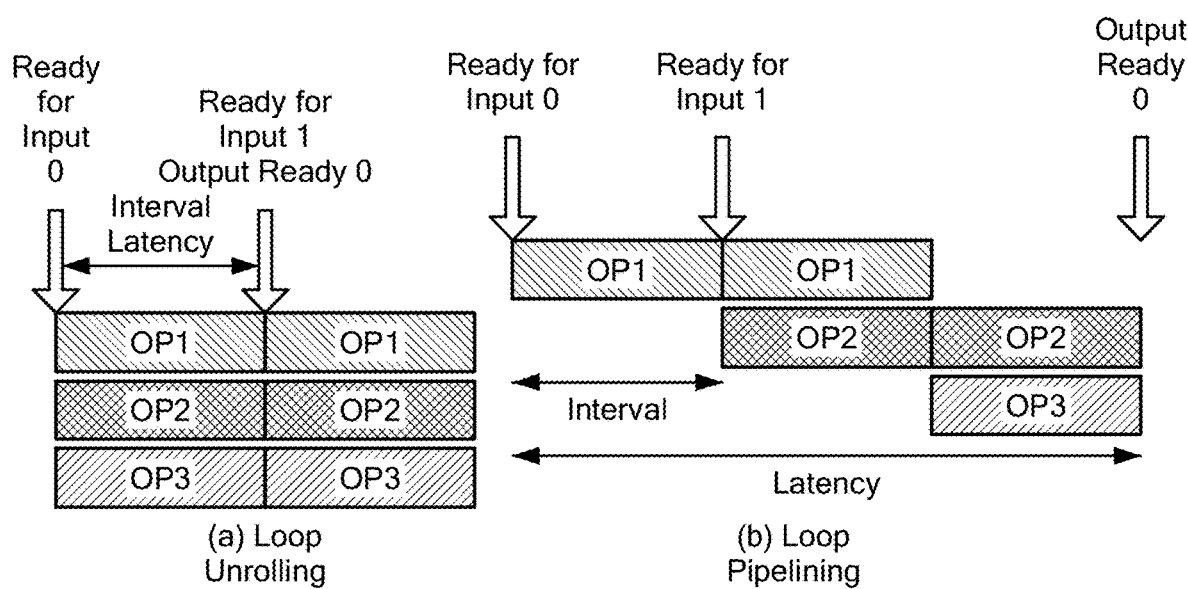
FIG. 8 is an example of loop unrolling/pipelining.

Equation 3 indicates that if the RF learning latency can be decreased by half, the minimum buffer size can be decreased by half, which can be useful in many practical systems. Further optimization of the RF learning architecture's latency can be achieved by employing FPGA parallelization techniques such as loop pipelining/unrolling. FIG. 8 shows an example of loop pipelining and unrolling, where a simple loop of three operations, i.e., OP1, OP2, and OP3, is executed twice. For simplicity, it is assumed that each operation takes one clock cycle to complete. With loop unrolling, memory access is increased to allow concurrent execution of the operation, bringing latency and interval to 1. With loop pipelining, the next OP1 operation is executed concurrently to the OP2 operation of the first loop iteration. This brings the interval to 1 clock cycle and the throughput to 1 output per clock cycle. Without unrolling/pipelining, the loop would need to wait 3 clock cycles to get a new input.

Figure 9:
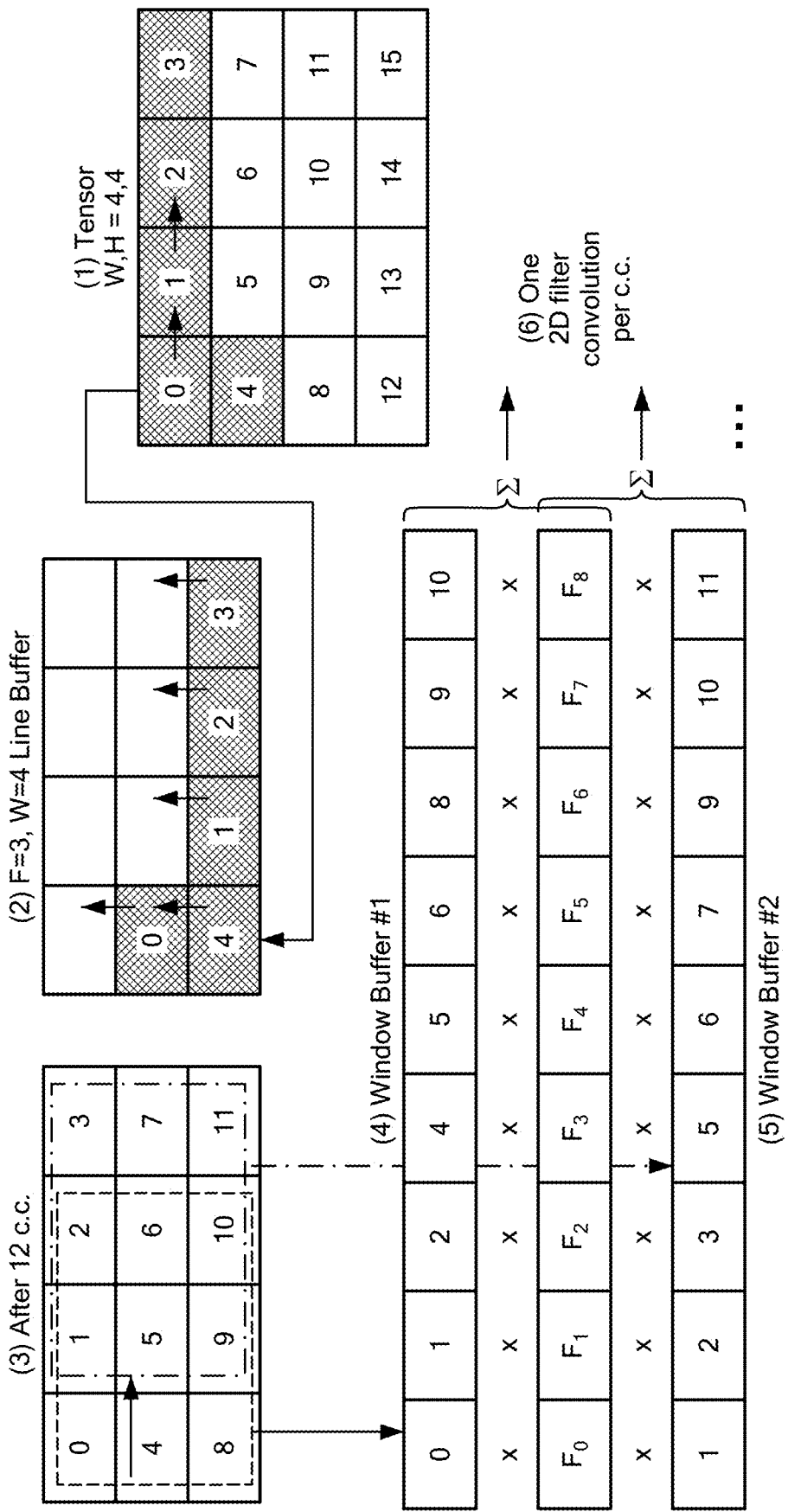
FIG. 9 is an example of line buffer and window buffer for 2D convolution operation.

3.2.1 Pipelined I/Q Convolution. Arguably, the most computationally expensive operation in the RF learning architecture is the convolution between filters and input. To reduce the latency of this operation, a combination of pipelining/unrolling and line/window buffering can be used. FIG. 9 shows an example of the combined functioning of the line and window buffers, and for simplicity setting W, H=4 and F=3. In the example, I/Q samples are read one by one and inserted into the line buffer (step 1). During the insertion into the line buffer, elements are shifted vertically, while the data from the uppermost line is discarded (step 2), so that after 12 clock cycles, the line buffer is filled (step 3). Since each line is located in a different memory location, the first window buffer can be filled by data from three line buffers in three clock cycles (step 4). The next window buffer simply discards the first column and reads the new column from the line buffers in one clock cycle. This, coupled with loop unrolling and pipelining, enables one filtering operation to be ready every clock cycle (step 5).

3.3 Polymorphic System Drivers

The polymorphic system includes drivers to access the peripherals from the CPU. A challenge in designing drivers for embedded systems is that the same FPGA peripherals can change address assignment, whereas in a traditional desktop system, the kernel contains the entire, immutable description of the hardware peripherals at compile time. This would require recompiling the kernel every time an FPGA implementation uses different physical addresses, which is not desirable. To address this issue, a device tree (DT) hardware description can be used. The DT separates the kernel from the description of the peripherals, which are instead located in a separate binary file called the device tree blob (DTB). This file is compiled from the device tree source (DTS) file, and contains not only the customized polymorphic system hardware addresses, but also every board-specific hardware peripheral information, such as the address of Ethernet, DMA, BRAMs, RF interface, and so on.

For the polymorphic system, customized device-tree entries can be generated for the convolutional neural network, BRAM controllers, and AXI timer. FIG. 10 shows customized device tree entries in the DTS file for the input BRAM controller and the RF learning architecture (the other entries are omitted due to space limitations). The most relevant entries are (i) the name of the peripheral, inserted before the '{' character; (ii) the reg entry, describing the starting physical address and the address space of the peripheral; and (iii) the compatible entry, which defines the "programming model" of the device and allows the operating system to identify the corresponding device driver.

Following the creation of the customized device-tree entries, these are included in the remainder portion of the global DTS file describing the ZC706 evaluation board; the DTB file is compiled and included in the evaluation board's SD card containing the operating system and the kernel image. At bootstrap, the bootloader loads the kernel image and the DTB so that the kernel creates appropriate peripherals in the /proc/device-tree/ directory. Thus, the customized drivers (which are address-agnostic) can "bind" to the peripheral by using the corresponding device-tree entry, and access the AXI-Lite and AXI-Full memory space for read/write operations as it would access a file (also called "character device").

The polymorphic platform described herein can be implemented in conjunction with a computing device that includes a combination of hardware, software, and firmware that allows the computing device to run an application layer or otherwise perform various processing tasks. Computing devices can include without limitation personal computers, work stations, servers, laptop computers, tablet computers, mobile devices, wireless devices, smartphones, wearable devices, embedded devices, microprocessor-based devices, microcontroller-based devices, programmable consumer electronics, mini-computers, main frame computers, and the like and combinations thereof.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), block random access memory (BRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the systems and methods described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in the systems and methods described herein.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities Network connection enables the computing device to communicate and interact with any combination of remote devices, remote networks, and remote entities via a communications link. The communications link can be any type of communication link including without limitation a wired or wireless link. For example, the network connection can allow the computing device to communicate with remote devices over a network which can be a wired and/or a wireless network, and which can include any combination of intranet, local area networks (LANs), enterprise-wide networks, medium area networks, wide area networks (WANS), virtual private networks (VPNs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission to and receipt of data via the communications link. A transceiver can include one or more devices that both transmit and receive signals, whether sharing common circuitry, housing, or a circuit boards, or whether distributed over separated circuitry, housings, or circuit boards, and can include a transmitter-receiver.

The computing device can include a browser and a display that allow a user to browse and view pages or other content served by a web server over the communications link. A web server, sever, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a services (DaaS), backend as a service (BaaS), test environment as a service (TEaaS), API as a service (APIaaS), and integration platform as a service (IPaaS).

4. Examples

Performance of the polymorphic deep learning communication system has been evaluated on a prototype system with the RF learning architecture implemented on a custom software-defined radio testbed of an off-the-shelf Xilinx ZC706 board equipped with a ZYNQ-7000 system-on-chip (SoC). A general-purpose hardware/software architecture for SoC was designed that enabled the creation of custom polymorphic wireless systems through the RF learning architecture. Then, a multi-purpose library based on high-level synthesis (HLS) was implemented that translated an RF learning architecture model implemented in software to a circuit implemented in the FPGA portion of the SoC. Optimization strategies such as pipelining and unrolling were leveraged to further reduce the latency of RF learning architecture by more than 50% with respect to the unoptimized version, with only 7% increase of hardware resource consumption. Then, device-tree entries and Linux drivers were designed and implemented to enable the system to utilize the RF learning architecture and other hardware peripherals from the software portion of the SoC.

A prototype was built entirely based on off-the-shelf equipment. Specifically, a Xilinx Zynq-7000 XC7Z045-2FFG900C system-on-chip (SoC) was used, which is a circuit integrating CPU, FPGA and I/O all on a single substrate. An SoC was chosen since it provides significant flexibility in the FPGA portion of the platform, thus allowing a full evaluation of the trade-offs during system design. Moreover, the Zynq-7000 fully supports embedded Linux, which in effect made the ZC706 a good prototype for an IoT platform. The Zynq-7000 contains two ARM Cortex-A9

MPCore CPUs and a Kintex-7 FPGA, running on top of a Xilinx ZC706 evaluation board.

An AD9361 RF interface from Analog Devices was used, which has a supporting frequency range between 70 MHz to 6.0 GHz and channel bandwidth between 200 kHz to 56 MHz. The AD9361 was chosen because it is commonly used in software-defined radio systems. Also, Analog Devices provides basic FPGA reference designs and kernel-space drivers to ease prototyping and extensions. Also, the AD9361 local oscillator (LO) frequency and RF bandwidth can be reconfigured at will through CPU registers.

The throughput of a polymorphic OFDM system (sometimes termed "Poly-OFDM" herein for convenience) was evaluated where the transmitter switched among 3 FFT sizes and 3 symbol modulation schemes without explicit notification to the receiver in a pseudo-random manner. This system can support real-time FFT/modulation reconfigurability without headers/coordination. Experiments on both line-of-sight (LOS) and non-line-of-sight (NLOS) channel conditions showed that the Poly-OFDM polymorphic OFDM system respectively achieved 90% and 87% of the throughput of a perfect-knowledge, and thus unrealistic, OFDM system (called herein Oracle) with a switching time of 250 ms.

The polymorphic architecture achieved 14% more accuracy than prior art on a complex 18-class inference problem. The polymorphic architecture achieved 52× and 8× latency and hardware consumption reduction. The polymorphic OFDM system achieved throughput within 87% of a perfect-knowledge Oracle system, in a challenging non line-of-sight scenario and with low switching time of 250 ms.

Figure 11:
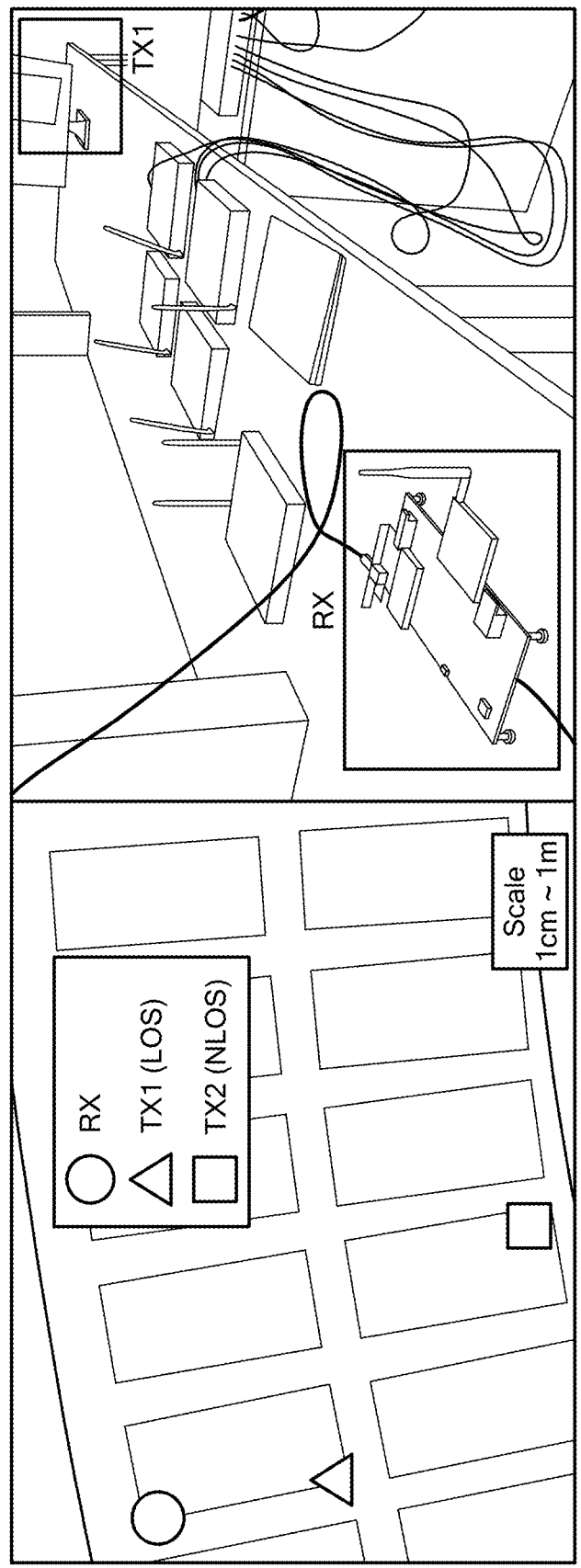
FIG. 11 is a schematic illustration placement of radios for experimental evaluation (left) and of an experimental setting (right).

Experimental Testbed and Data Collection. To study a polymorphic system as described herein under realistic channel environments, an experimental setup was provided as shown in FIG. 11. These scenarios investigated a line-of-sight (LOS) configuration where the transmitter was placed approximately 3 m from the receiver, and a more challenging non-line-of-sight (NLOS) channel condition where the transmitter was placed at 7 m from the receiver and in the presence of several obstacles between them. Thus, the experiments were performed in a contested wireless environment with severe interference from nearby WiFi devices as well as multipath effect given by several close objects.

Regarding the data collection and testing process, a ~10 GB dataset was constructed by collecting waveform data in the line-of-sight (LOS) configuration. This data was then used to train the RF learning architecture through the Keras API. Then, the models were tested on live-collected data in both LOS and NLOS conditions. The transmitter radio used was a Zedboard equipped with an AD9361 as RF front-end and using Gnuradio for baseband processing. Waveforms were transmitted at center frequency of 2.432 GHz (i.e., WiFi's channel 5).

4.1 Example 1: Single-Carrier Evaluation

The problem of joint modulation, bandwidth, and carrier frequency recognition in a single-carrier system was considered where (i) modulation was chosen among BPSK, QPSK, 8PSK, 16-QAM, 32-QAM, and 64-QAM; (ii) spectrum was shifted of 0, 1 KHz and 2 KHz from its center frequency; and (iii) transmitter's sampling rate was chosen among 1, 2, 5 and 10M samples per second. The performance of the learning architecture was first considered (Section 4.1.1.). Then the impact of the hyper-parameters was explored (Section 4.1.2). Then the impact of the sampling rate was evaluated (Section 4.1.3). Results on the LOS scenario for the single-carrier scenario are reported in Section 4.1. The performance of the RF learning architecture on the NLOS scenario with the multi-carrier polymorphic OFDM system is reported in Section 4.2.

4.1.1 Comparison with existing architectures. The RF learning architecture was first compared with traditional dense networks and with existing work in RF waveform classification using convolutional neural networks. A prior art approach, called for simplicity Linear, considered an input tensor of dimension 1×W·H×2 and convolutional layers with filters of dimension 1×F×2. Thus, the filters in the first convolutional layer performed linear convolution over a set of F consecutive I/Q samples. The experiment attempted to train an architecture of O'Shea et al., which has M=7 convolutional layers with C=64 filters each and K=2 dense layers with 128 neurons each. (Timothy J. O'Shea, Tamoghna Roy, and T. Charles Clancy. 2018. Over-the-Air Deep Learning Based Radio Signal Classification. *IEEE Journal of Selected Topics in Signal Processing* 12, 1 (February 2018), 168-179. doi.org/10.1109/JSTSP.2018.2797022) However, this huge architecture was severely overfitting and thus showed very poor performance. Therefore, the RF learning architecture was compared with a smaller prior art architecture proposed in O'Shea et al., which presented M=2 convolutional layers with C=256.80 and K=1 with 256 neurons. (Timothy J. O'Shea, Johnathan Corgan, and T. Charles Clancy. 2016. Convolutional Radio Modulation Recognition Networks. In *International Conference on Engineering Applications of Neural Networks*. Springer, 213-226.)

Figure 12:
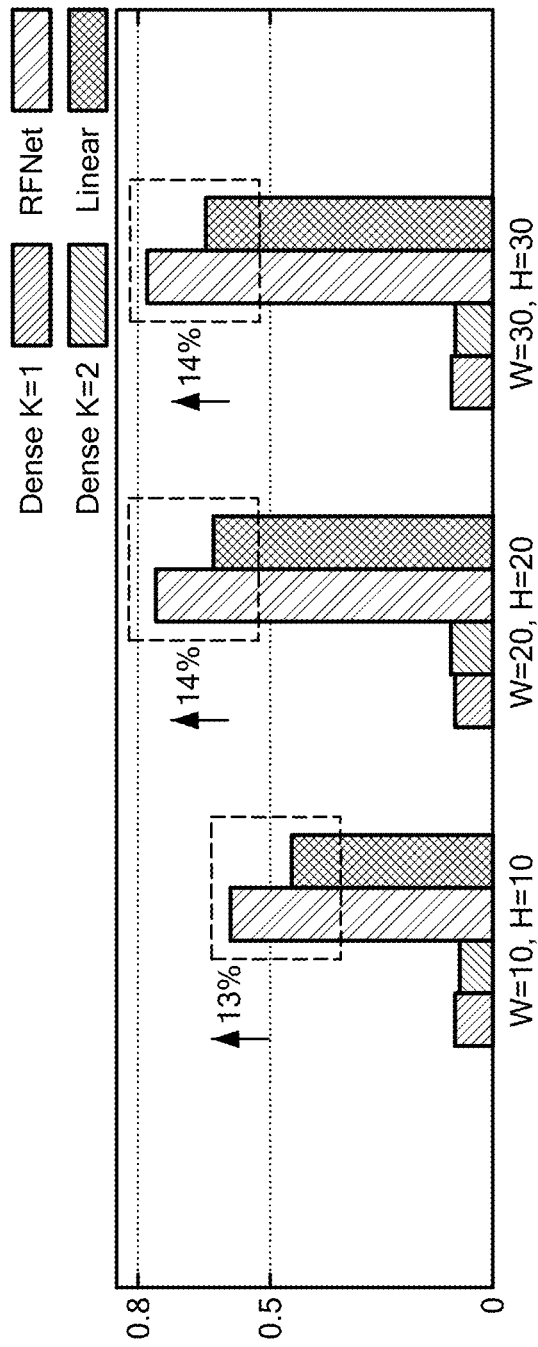
FIG. 12 is a comparison between the RF learning, dense and linear architectures.

FIG. 12 shows the test-set accuracy obtained for a subset of the considered architectures, where the RF learning architecture was trained with M=1 convolutional layer with C=25 filters, and no dense layer (K=0). The obtained results indicate that the traditional dense networks did not recognize complex RF waveforms, as they attained slightly more accuracy (8%) than the random-guess accuracy (5.5%), regardless of the number of layers. This is because dense layers were not able to capture localized, small-scale I/Q variations in the input data, which was instead done by convolutional layers. Moreover, FIG. 12 indicates that the RF learning architecture was 14% more accurate than Linear, despite using a much simpler architecture. This is due to the fundamental difference between how the convolutional layers in the polymorphic system and Linear process I/Q samples.

Figure 13:
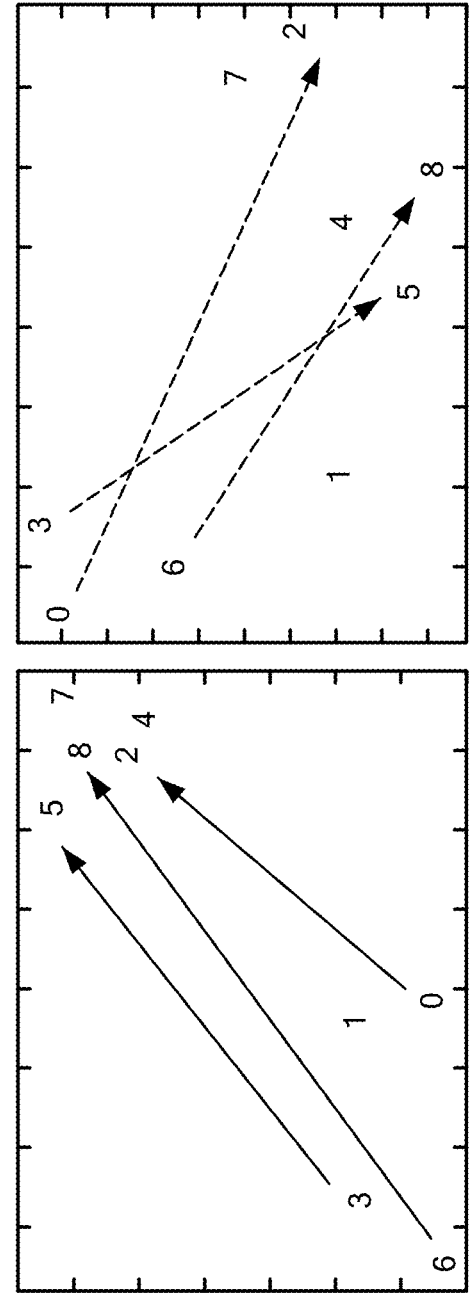
FIG. 13 is an illustration of first-layer filters in the RF learning architecture.

To confirm how the RF learning architecture learns transitions in the I/Q complex constellation plane, FIG. 13 shows the I/Q representation of two filters in the first convolutional layer. This experiment suggested that the RF learning architecture learned unique transitions in the I/Q plane, as the filters' output was maximized for patterns that can only occur in a certain modulation, respectively, transitions from the third to first quadrant and from second to fourth are more likely to occur in PSK modulation than in QAM modulations.

Figure 14:
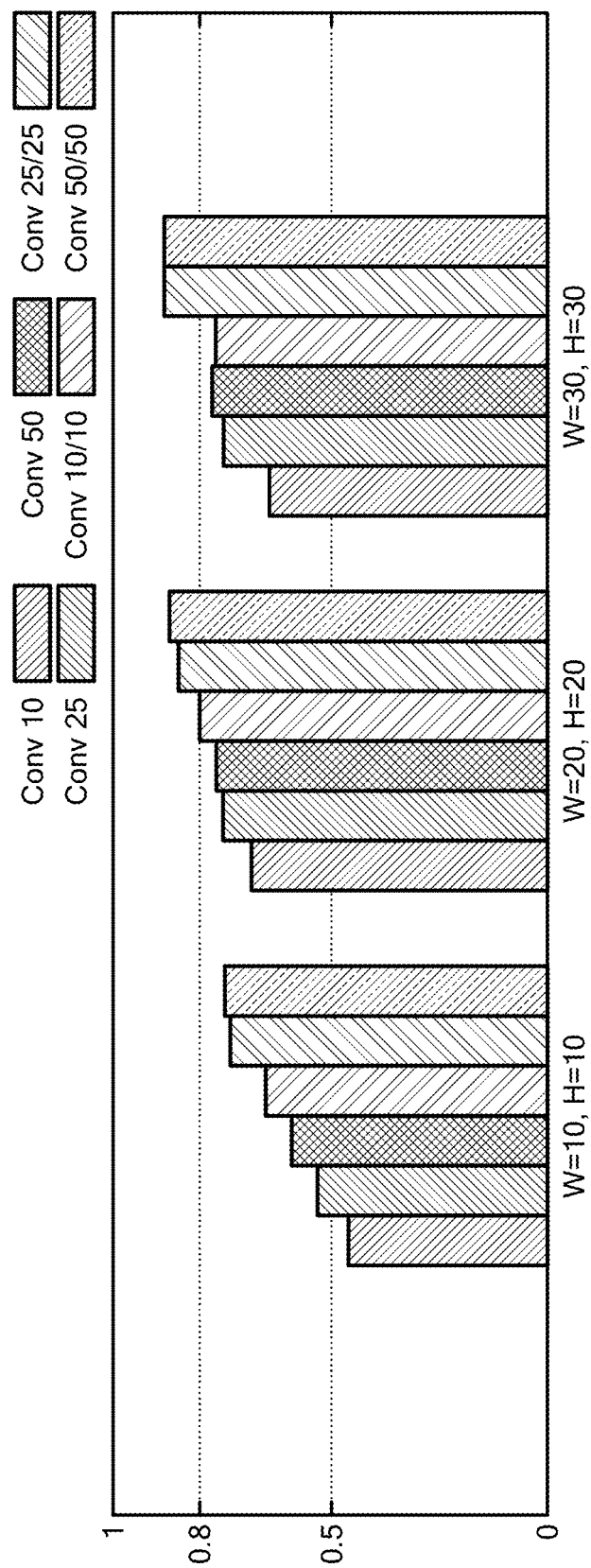
FIG. 14 is a graph of test-set classification accuracy vs. input size W/H vs. M with K=0 (no dense layer) (top); and confusion matrices as a function of M, W, and H (bottom).
Figure 15:
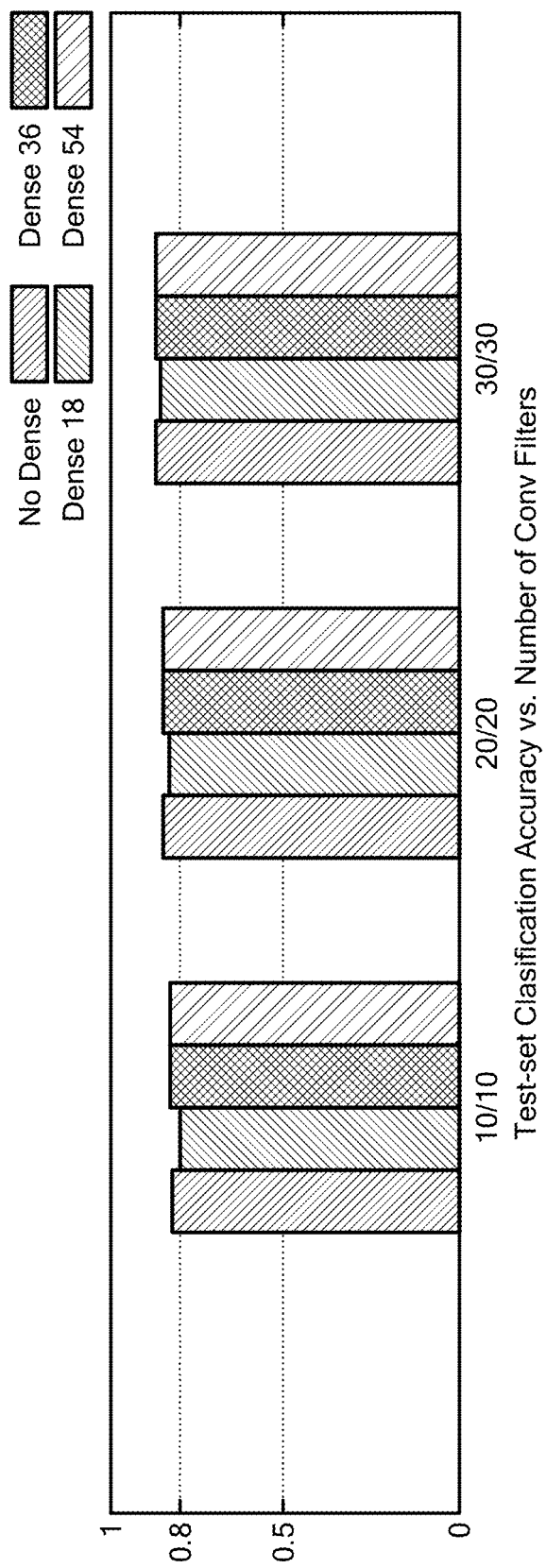
FIG. 15 is a graph of test-set classification accuracy vs. number of filters vs. dense layer size.

4.1.2 RF learning architecture hyper parameter evaluation. The impact of the number of convolutional layers M and dense layers K, as well as the input size (W) and filter size (F) was evaluated on the performance of the RF learning architecture. FIG. 14 shows accuracy as a function of W and H, for hyper-parameters M=1, 2 and C=10, 25, 50. No dense layer (K=0) was used, as their impact was studied as shown in FIG. 15. The results concluded that increasing C did improve the performance but up to a certain extent. Indeed, switching to C=50 did not improve the performance much, especially when M=2. This was because the number of distinguishing I/Q patterns was limited in number among different modulations, and thus the filters in excess ended up learning similar patterns. Furthermore, increasing W and H increased accuracy significantly, since a larger input size allowed to compensate for the adverse channels/noise conditions. Finally, FIG. 15 illustrates the impact of K. FIG. 15 suggested that the accuracy does not increase when adding a dense layer, regardless of its size, which indicates the correctness of the choice to exclude dense layers.

Figure 16:
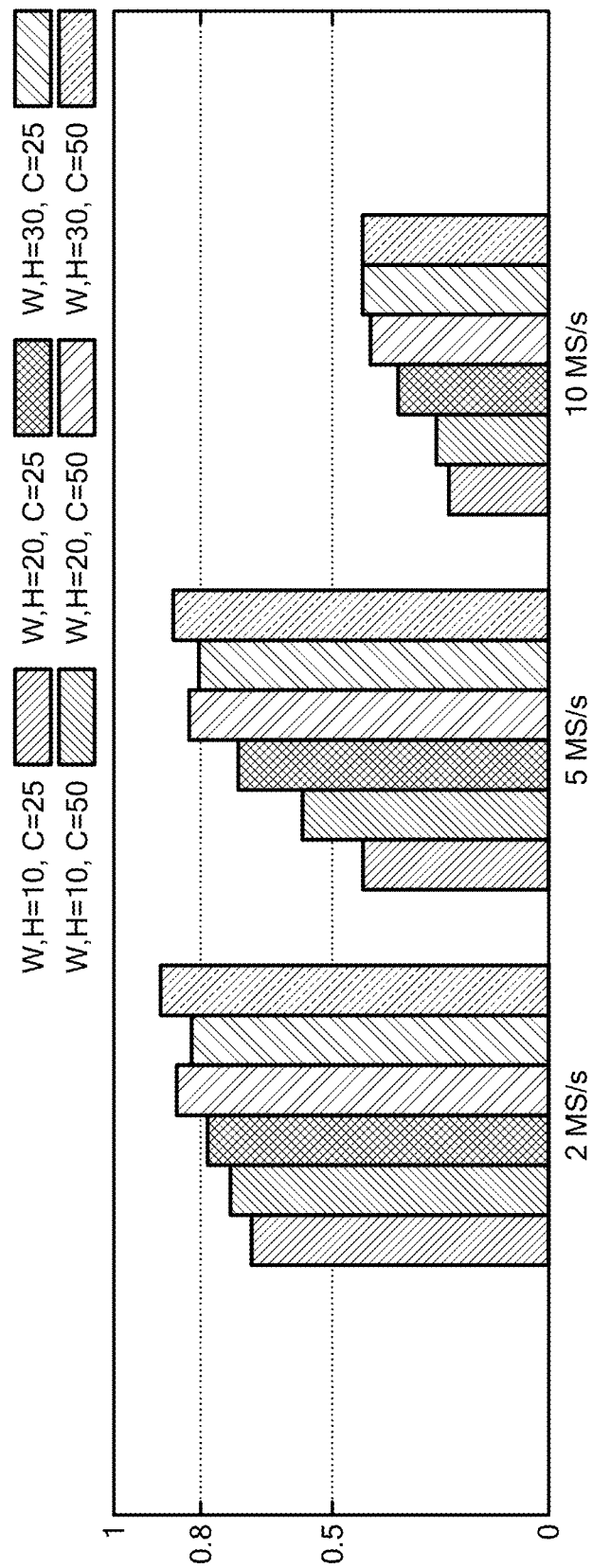
FIG. 16 is a graph of test-set classification accuracy as a function of transmitter's sampling rate.
Figure 17:
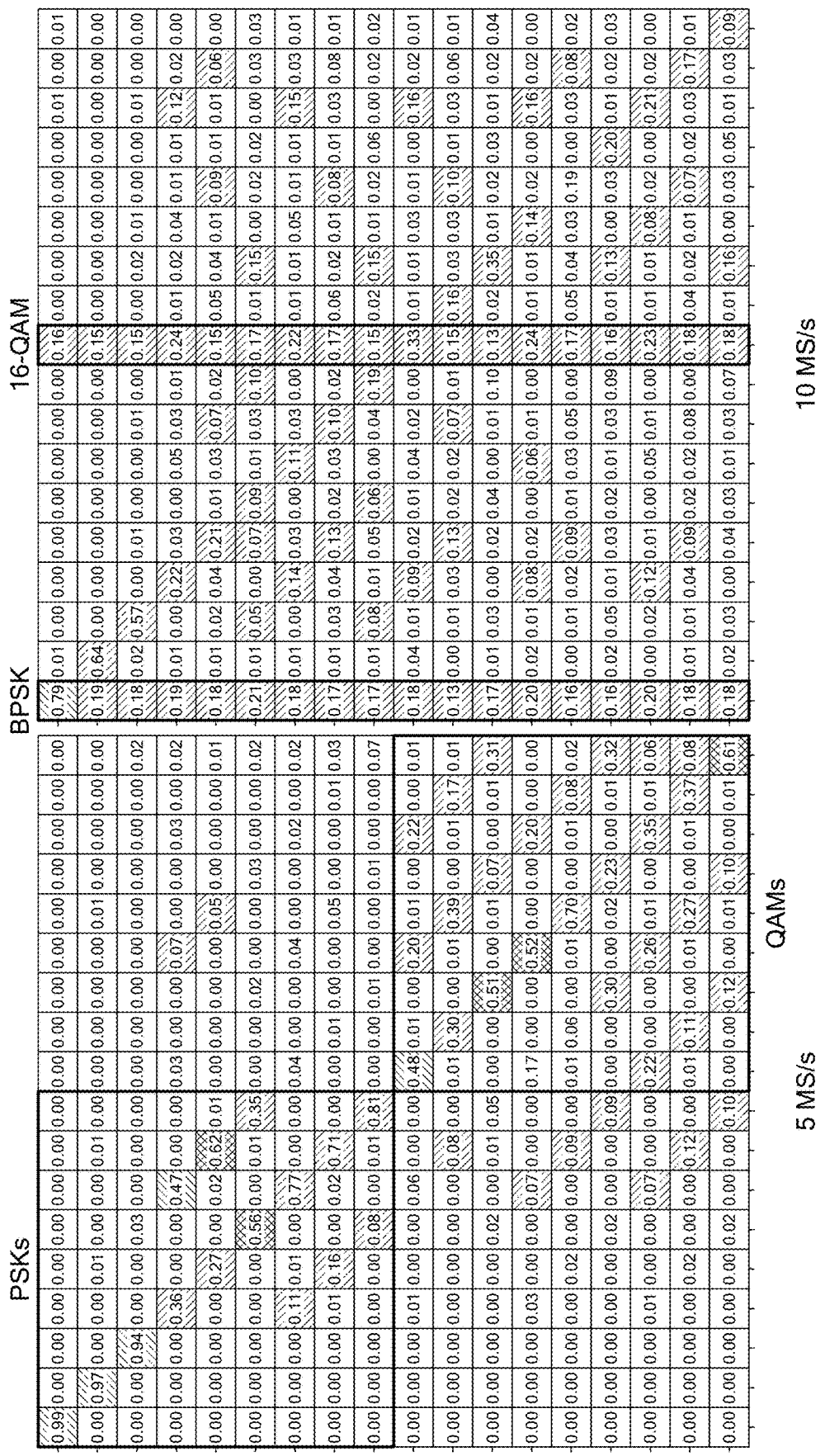
FIG. 17 is an illustration of confusion matrices for transmitter's sampling rate of 5 MS/s and 10 MS/s, W, H=10, C=50 model.

4.1.3 Impact of the sampling rate. The impact of the transmitter's sampling rate was investigated, as shown in FIG. 16, where the classification accuracy is shown for different W, H and C values. The confusion matrices for the W,H=10, C=50 architectures are shown in FIG. 17. (Class labels are ordered by modulation and frequency shift, i.e., from "BPSK, 0 KHz", "BPSK, 1 KHz", . . . to "64-QAM, 2 KHz".) These results confirmed that the performance of the RF learning architecture decreased as the transmitter's sampling rate increased. This is because, as shown in Section 3, the RF learning architecture learned the I/Q transitions between the different modulations. Therefore, as the transmitter's sampling rate increased, the model had fewer I/Q samples between the constellation points. Indeed, the confusion matrices show that with 5 MS/s the model became further confused with QAM constellations, and with 10 MS/s higher-order PSK and QAM modulations "collapse" onto the lowest-order modulations (i.e., BPSK and 16-QAM), since it became challenging to distinguish among them.

4.2 Example 2: Multi-Carrier Evaluation: Polymorphic OFDM

To evaluate the system-wide throughput performance of the polymorphic system, a multi-carrier polymorphic OFDM system was implemented and evaluated. This system supported 3 different FFT sizes (64, 128, 256) and 3 different symbol modulations in the FFT bins (BPSK, QPSK, 8PSK), creating in total a combination of 9 different parameter sets which were switched pseudo-randomly by the transmitter. In the following, the C=25, 25, 20×20, pipelined RF learning architecture was used, which presented latency of about 17 ms (see Section 4.3). In these experiments, (i) the transmitter's sampling rate was set to 5M samples/sec; (ii) polymorphic system's buffer size B was set to 250 k I/Q samples; and (iii) the switching time of the transmitter was set to 250 ms. Thus, RF learning was run approximately five times during each switching time (see Section 3.2).

Comparison of Poly-OFDM to a perfect-knowledge system. An aspect to be evaluated is how the polymorphic OFDM system, an inference-based system, compares with an ideal system that has perfect knowledge of the modulation and FFT size being used by the transmitter at each time, called Oracle for simplicity herein. Although Oracle cannot be implemented in practice without a perfect synchronization between transmitter and receiver, this experiment was useful to understand what the throughput loss was with respect to a system where the physical-layer configuration is known a priori.

FIG. 18 shows the confusion matrices of the experiment, where the classes are labeled by FFT size and modulations, i.e., FFT-64-BPSK to FFT-256-8PSK, in both LOS and NLOS scenarios. The results indicate that the RF learning architecture was very accurate in predicting the FFT size of the polymorphic OFDM transmission, while it sometimes confused some of the modulations, especially in the 64 and 128 FFT sizes. However it can be noted that (i) these models were trained with unprocessed I/Q samples (i.e., no OFDM packet demodulation) and (ii) the network had never seen NLOS transmissions during training, which overall makes the results satisfactory.

Figure 19:
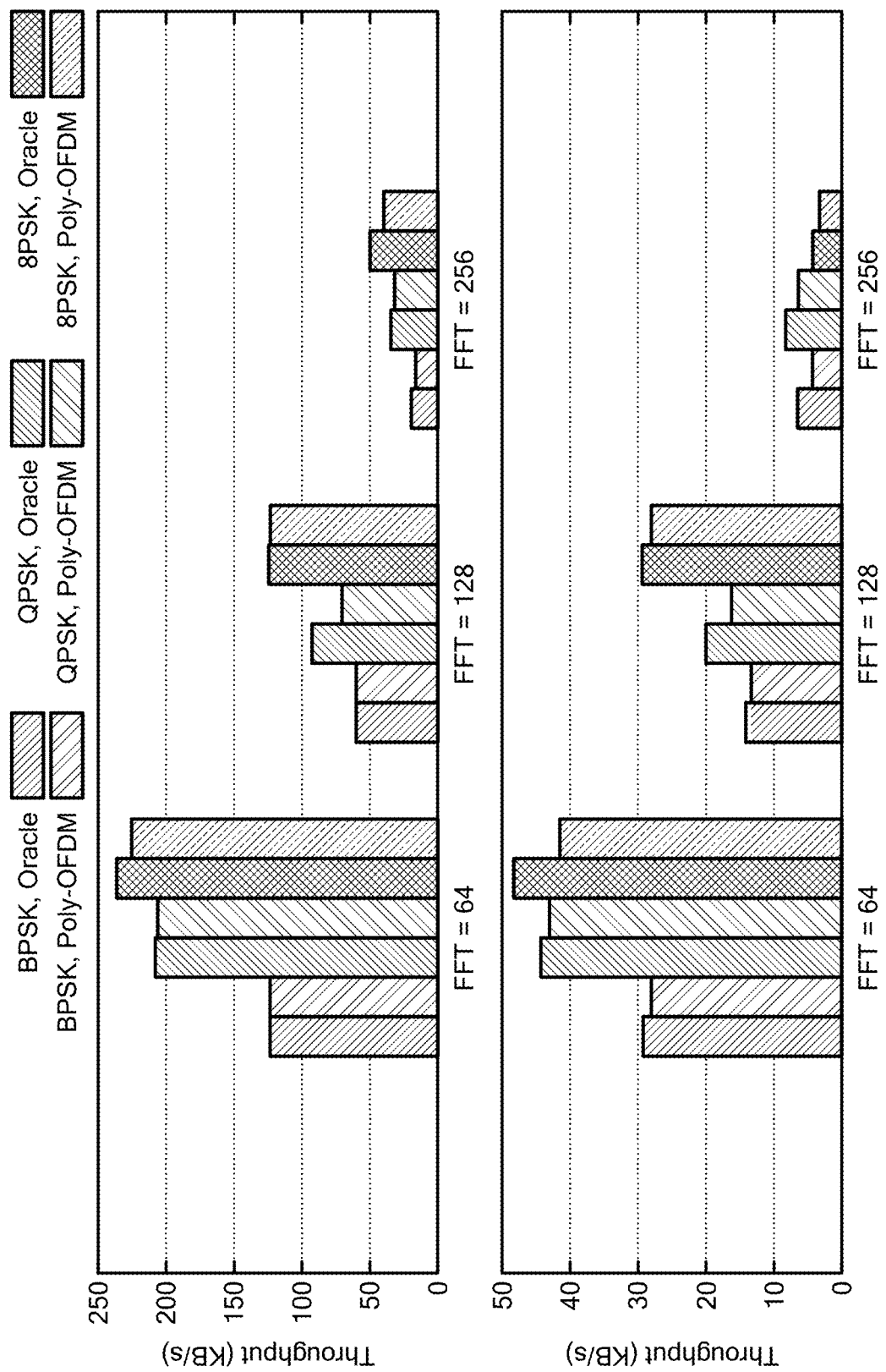
FIG. 19 are graphs illustration a comparison between Oracle and the polymorphic OFDM system for LOS (top) and NLOS (bottom) scenarios.

This was confirmed by FIG. 19, where the comparison between Oracle and the polymorphic OFDM system is shown as a function of the FFT size and the symbol modulation. The overall throughput results decreased in the NLOS scenario, which was expected given the impairments imposed by the challenging channel conditions. On the other hand, the results in FIG. 19 confirm that the polymorphic OFDM system was able to obtain similar throughput performance with that of a traditional OFDM system, obtaining on the average 90% and 87% throughput of that of the traditional system.

4.3 Example 3: RFNet Latency Evaluation

In this section, the latency and hardware consumption of different RF learning architectures were evaluated, and they were compared with (i) a C++ implementation running in the CPU of the testbed; and (ii) existing work of O'Shea et al. (Timothy J. O'Shea, Johnathan Corgan, and T. Charles Clancy. 2016. Convolutional Radio Modulation Recognition Networks. In *International Conference on Engineering Applications of Neural Networks*. Springer, 213-226). The latency measurements were computed through the AXI Timer for maximum accuracy. Table 1 shows the latency, number of parameters, and BRAM occupation. As can be seen, the RF learning architecture was able to significantly reduce latency and memory occupation with respect to the existing work of O'Shea et al. There was a decrease of an order of magnitude in almost every considered scenario. This was because the existing architecture used several parameters (on the order of millions), while the polymorphic system only needed ~200 k parameters in the worst case.

TABLE 1

Latency/hardware consumption evaluation

| Model | Input | Latency | Parameters | BRAM |
|---|---|---|---|---|
| RFNet C = 25 | 10 × 10 | 2.918 ms | ~11k | 1% |
|  | 20 × 20 | 26.55 ms | ~45k | 7% |
|  | 30 × 30 | 93.35 ms | ~81k | 15% |
| RFNet C = 50 | 10 × 10 | 5.835 ms | ~23k | 3% |
|  | 20 × 20 | 53.11 ms | ~90k | 14% |
|  | 30 × 30 | 233.3 ms | ~203k | 29% |
| RFNet C = 25, 25 | 10 × 10 | 6.704 ms | ~10k | 2% |
|  | 20 × 20 | 38.41 ms | ~17k | 8% |
|  | 30 × 30 | 144.9 ms | ~34k | 17% |
| RFNET C = 50, 50 | 10 × 10 | 21.41 ms | ~31k | 4% |
|  | 20 × 20 | 100.3 ms | ~40k | 16% |
|  | 30 × 30 | 336.9 ms | ~81k | 34% |
| Linear | 1 × 128 | 579.8 ms | ~2M | 16% |
|  | 1 × 400 | 2,026 ms | ~8M | 64% |

TABLE 2

Pipelined vs. CPU Latency

| Model | Input | CPU | Pipelined | LUT |
|---|---|---|---|---|
| RFNet C = 25 | 10 × 10 | 49.31 ms | 1.19 ms | +3% |
|  | 20 × 20 | 478.4 ms | 8.077 ms | +7% |
|  | 30 × 30 | 1592 ms | 25.54 ms | +9% |

TABLE 2-continued

Pipelined vs. CPU Latency

| Model | Input | CPU | Pipelined | LUT |
|---|---|---|---|---|
| RFNet C = 50 | 10 × 10 | 106.4 ms | 2.381 ms | +6% |
| | 20 × 20 | 934.2 ms | 16.15 ms | +12% |
| | 30 × 30 | 3844 ms | 63.81 ms | +20% |
| RFNet C = 25, 25 | 10 × 10 | 122.1 ms | 3.959 ms | +1% |
| | 20 × 20 | 677.9 ms | 16.29 ms | +4% |
| | 30 × 30 | 2354 ms | 49.57 ms | +7% |
| RFNET C = 50, 50 | 10 × 10 | 363.9 ms | 13.51 ms | +2% |
| | 20 × 20 | 1826 ms | 48.87 ms | +7% |
| | 30 × 30 | 5728 ms | 131.7 ms | +11% |

Table 2 shows the comparison between the pipelined version of the convolutional neural network circuits and the CPU latency, as well as the look-up table (LUT) consumption increase with respect to the unpipelined version. From Table 2, it can be concluded that on the average, the parallelization strategies described herein brought close to 60% and 100% latency reduction with respect to the unoptimized and CPU versions, respectively, with a LUT utilization increase of about 7% on the average.

Figure 20:
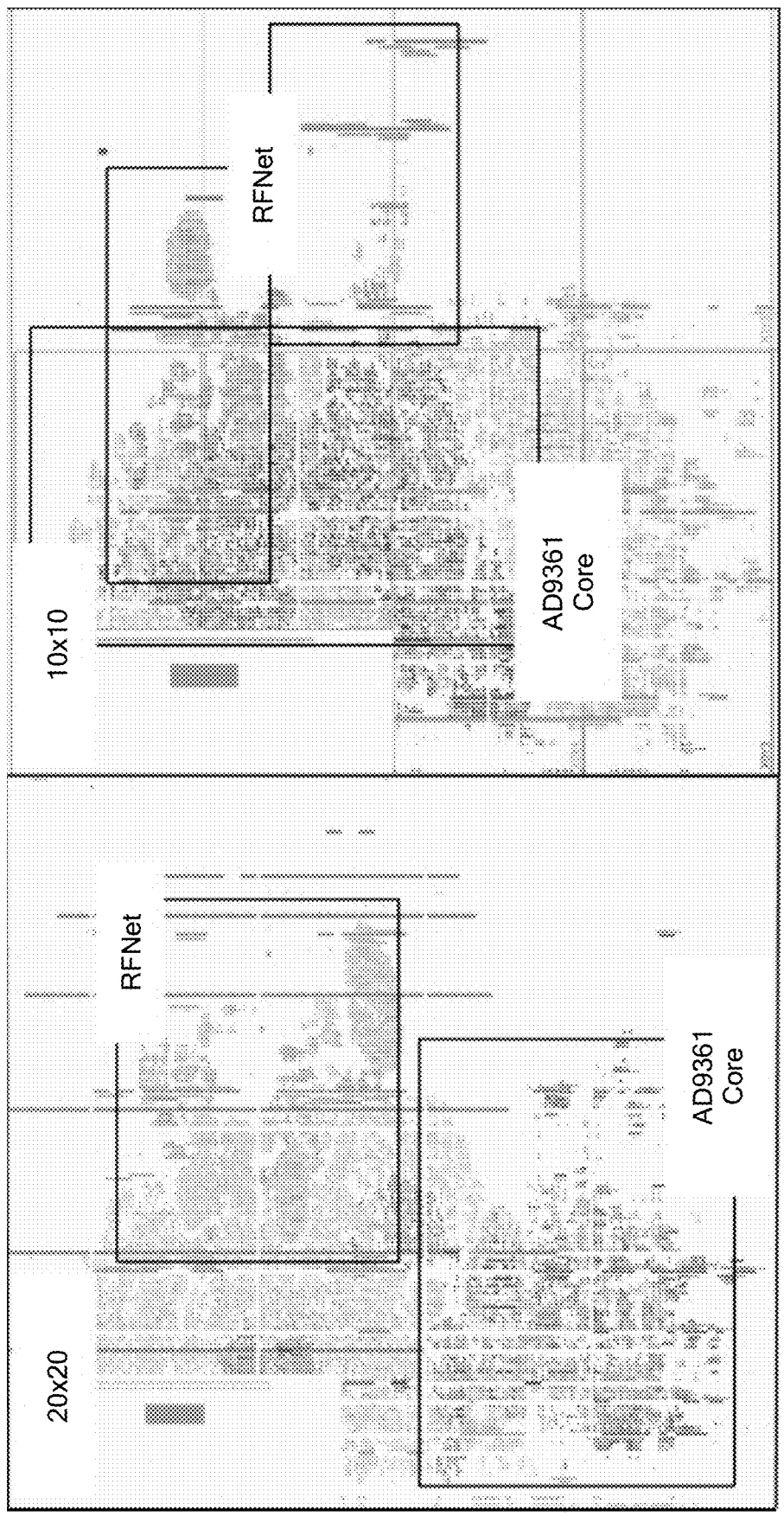
FIG. 20 is an illustration of FPGA implementations of the polymorphic system.

To give a perspective of the amount of resources consumed on the FPGA, FIG. 20 shows the FPGA implementation of respectively 10×10 and 20×20 convolutional neural network model, both pipelined and with C=25,25 architecture, where the resource consumption of the convolutional neural network with respect to the AD9361 circuitry is highlighted. FIG. 20 indicates that the resource consumption of the convolutional neural network circuit was significantly lesser than the AD9361 one in the 10×10 case, and becomes comparable with the 20×20 architecture.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A polymorphic wireless communication system comprising:
 a radio frequency (RF), optical, or acoustic receiver operative to receive a signal from a transmitter; and
 a processing system comprising:
  receiver circuitry in communication with the RF, optical, or acustic receiver to produce in-phase and quadrature (I/Q) input samples from the signal,
  a learning module operative to determine transmitted physical layer parameters of the signal, using a trained classification module operative to receive the I/Q input samples from the receiver circuitry and process the I/Q input samples to determine transmitted physical layer parameters from the transmitter, and
  a polymorphic processing unit including a polymorphic receiver operative to demodulate data from the signal based on the determined transmitted physical layer parameters.

2. The system of claim 1, wherein the learning module is operative to arrange the I/Q input samples in an I/Q complex plane.

3. The system of claim 1, wherein the trained classification module is trained to recognize I/Q patterns in an I/Q complex plane.

4. The system of claim 1, wherein the trained classification module is trained to recognize transitions between occurrences of the I/Q input samples in an I/Q complex plane.

5. The system of claim 1, wherein the polymorphic processing unit is operative to determine a modulation scheme of the transmitter from recognized transitions between occurrences of the I/Q input samples in an I/Q complex plane.

6. The system of claim 1, wherein the learning module is operative to produce a probability distribution of parameter sets of the transmitter, and the polymorphic processing unit is operative to select one of the parameters sets with a highest probability.

7. The system of claim 1, wherein the trained classification module is configured to carry out operations concurrently in loops and/or in a pipeline.

8. The system of claim 1, wherein the receiver circuitry is operative to transmit a stream of the I/Q input samples to a data storage buffer for transmission at a controlled rate to the learning module.

9. The system of claim 8, wherein the polymorphic processing unit is in communication with the data storage buffer to receive the I/Q input samples for demodulation based on the determined transmitted physical layer parameters.

10. The system of claim 1, wherein the polymorphic processing unit is operative to alter a configuration of a receiver chain based on the determined transmitted physical layer parameters to demodulate the data.

11. The system of claim 1, wherein the trained classification module comprises a deep learning neural network including a plurality of layers and is operative to process the I/Q input samples through the layers to determine the transmitted physical layer parameters.

12. The system of claim 1, wherein the trained classification module comprises a convolutional neural network, a multi-layer perceptron, a feedforward network, or a support vector machine.

13. The system of claim 1, wherein the physical layer includes one or more of a convolution layer, a dense layer, a fully-connected layer, a rectified linear layer, and a pooling layer.

14. The system of claim 1, wherein the processing system is operative to configure each layer of a plurality of layers with one or more of a weight, filter, bias, or activation function.

15. The system of claim 1, wherein the processing system is operative to reconfigure the trained classification module operate with one or more of a different weight or filter to change a property that is classified.

16. The system of claim 1, wherein the learning module comprises learning circuitry including one or more logic devices.

17. The system of claim 16, wherein the one or more logic devices include one or more of a field programmable gate array (FPGA), application specific integrated circuit (ASIC), complex programmable logic device (CPLD), small-scale integrated circuit, programmable logic array, programmable logic device, and masked-programmed gate array.

18. The system of claim 1, wherein the determined physical layer parameters include one or more of a symbol modulation scheme, frequency value, phase value, amplitude value, symbol modulation rate, fast Fourier transform size, carrier frequency, bandwidth, frequency resolution, number of carriers, and bandwidth of carriers.

19. The system of claim 1, wherein the processing system is operative to determine transmitted physical layer parameters from signals transmitted using a digital modulation scheme comprising phase-shift keying, binary phase-shift keying, quadrature phase-shift keying, 8-phase-shift keying, 16-phase-shift keying, frequency-shift keying, amplitude-shift keying, quadrature amplitude modulation, or orthogonal frequency division multiplexing.

20. The system of claim 1, wherein the transmitter is operative to alter one or more physical layer parameters for transmission of the signal, the parameters including one or more of carrier frequency, fast Fourier transform (FFT) size and symbol modulation.

21. The system of claim 1, wherein the receiver comprises an RF receiver and the transmitter comprises an RF transmitter.

22. A method of polymorphic wireless communication using the system of claim 1, comprising:
  receiving the signal from the transmitter at the receiver;
  determining the transmitted physical layer parameters of the signal; and
  demodulating data from the signal based on the determined transmitted physical layer parameters.

* * * * *